US012693607B2

(12) United States Patent
Shimizu et al.

(10) Patent No.: US 12,693,607 B2
(45) Date of Patent: Jul. 28, 2026

(54) TWO-COMPONENT DEVELOPER

(71) Applicant: KYOCERA Document Solutions Inc., Osaka (JP)

(72) Inventors: Tamotsu Shimizu, Osaka (JP); Kohei Terasaki, Osaka (JP); Yusuke Kurano, Osaka (JP); Masashi Yamashita, Osaka (JP); Eriko Takeuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 424 days.

(21) Appl. No.: 18/575,573

(22) PCT Filed: Mar. 31, 2022

(86) PCT No.: PCT/JP2022/016381

§ 371 (c)(1),
(2) Date: Dec. 29, 2023

(87) PCT Pub. No.: WO2023/281883

PCT Pub. Date: Jan. 12, 2023

(65) Prior Publication Data

US 2024/0319629 A1 Sep. 26, 2024

(30) Foreign Application Priority Data

Jul. 9, 2021 (JP) ................................ 2021-114544

(51) Int. Cl.
*G03G 9/097* (2006.01)
*G03G 9/08* (2006.01)
*G03G 9/113* (2006.01)

(52) U.S. Cl.
CPC ....... *G03G 9/09733* (2013.01); *G03G 9/0819* (2013.01); *G03G 9/1136* (2013.01); *G03G 9/1139* (2013.01)

(58) Field of Classification Search
CPC ............ G03G 9/09733; G03G 9/0819; G03G 9/1136; G03G 9/1139
See application file for complete search history.

(56) References Cited

U.S. PATENT DOCUMENTS 6,054,243 A 4/2000 Yamane et al.
6,187,490 B1 2/2001 Taya et al.
(Continued)

FOREIGN PATENT DOCUMENTS

JP H065393 B2 * 1/1994 .......... G03G 9/1139
JP H11-133672 A 5/1999
(Continued)

OTHER PUBLICATIONS

English machine translation of the description of JP-2007033631-A (Year: 2007).*
(Continued)

*Primary Examiner* — Mark F. Huff
*Assistant Examiner* — Boone Alexander Evans
(74) *Attorney, Agent, or Firm* — Studebaker Brackett PLLC

(57) ABSTRACT

In a two-component developer, external additive particles of toner particles include resin particles. The resin particles contain a crosslinked resin including a repeating unit derived from a crosslinking agent. Carrier particles each include a carrier core and a coat layer covering a surface of the carrier core. The coat layers contain a coating resin and barium titanate particles. The coating resin includes a silicone resin. The barium titanate particles have a number average primary particle diameter within a range of 100 nm to 500 nm. The barium titanate particles have a content within a range of 5 parts by mass to 45 parts by mass relative to 100 parts by mass of the coating resin. A rate of a mass of the coat layers to a mass of the carrier cores is greater than 0.0% by mass
(Continued)

and no greater than 4.9% by mass. The carrier cores have a shape factor within a range of 34.0% to 85.0%.

11 Claims, 1 Drawing Sheet

(56) References Cited

U.S. PATENT DOCUMENTS

| | | | | |
|---|---|---|---|---|
| 2007/0298339 | A1 * | 12/2007 | Kozuru | G03G 9/1138 430/111.1 |
| 2020/0301302 | A1 | 9/2020 | Tsurumi et al. | |

FOREIGN PATENT DOCUMENTS

| | | | | |
|---|---|---|---|---|
| JP | 2000-330342 | A | | 11/2000 |
| JP | 2003-280284 | A | | 10/2003 |
| JP | 2007033631 | A | * | 2/2007 |
| JP | 2017-097252 | A | | 6/2017 |
| JP | 2018-142017 | A | | 9/2018 |
| JP | 2020-034599 | A | | 3/2020 |
| JP | 2020-106767 | A | | 7/2020 |
| JP | 2020-154225 | A | | 9/2020 |

OTHER PUBLICATIONS

English machine translation of the description of JP-H065393-B2 (Year: 1994).*

"Notice of Reasons for Refusal" Office Action issued in JP 2023-533437; mailed by the Japanese Patent Office on Jan. 28, 2025.

* cited by examiner

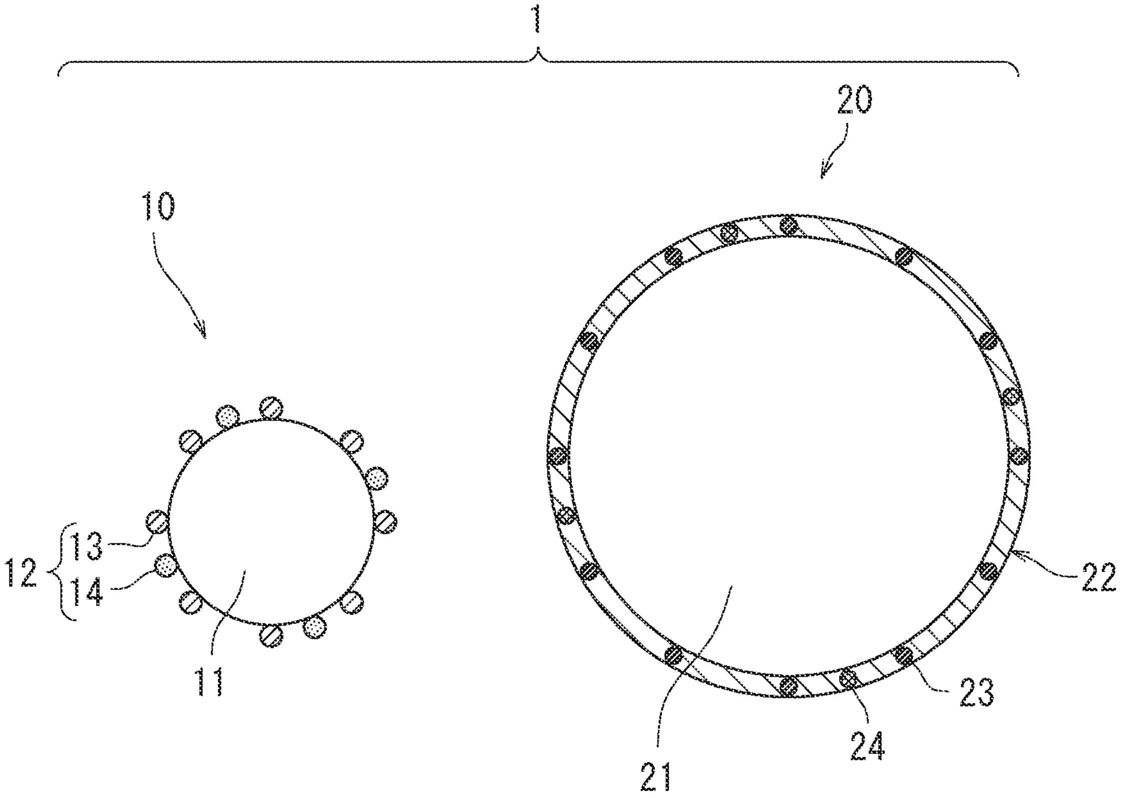
1
10
20
12
13
14
11
21
22
23
24

TWO-COMPONENT DEVELOPER

TECHNICAL FIELD

The present invention relates to a two-component developer.

BACKGROUND ART

Image forming apparatuses for forming images with toner are required to charge the toner to a desired charge amount and form images with desired image density. For example, the resin-coated carrier disclosed in Patent Literature 1 includes resin coat layers with a mass of 0.01 to 2.0% by mass relative to the mass of carrier cores.

CITATION LIST

Patent Literature

Patent Literature 1
Japanese Patent Application Laid-Open Publication No. 2000-330342

SUMMARY OF INVENTION

Technical Problem

However, the inventors' studies have revealed that the resin-coated carrier disclosed in Patent Literature 1 is insufficient in terms of improvement on fog resistance, stable formation of images with desired image density, reduction of image density differences within formed images, and inhibition of occurrence of image defects resulting from cleaning failure.

The present invention has been made in view of the foregoing and has its object of providing a two-component developer that contributes to excellent fog resistance, stable formation of images with desired image density, reduction of image density differences within formed images, and inhibition of occurrence of image defects resulting from cleaning failure.

Solution to Problem

A two-component developer according to the present invention contains a toner containing toner particles and a carrier containing carrier particles. The toner particles each include a toner mother particle and external additive particles provided on a surface of the toner mother particle. The external additive particles include resin particles. The resin particles contain a crosslinked resin including a repeating unit derived from a crosslinking agent. The carrier particles each include a carrier core and a coat layer covering a surface of the carrier core. The coat layers contain a coating resin and barium titanate particles. The coating resin includes a silicone resin. The barium titanate particles have a number average primary particle diameter of at least 100 nm and no greater than 500 nm. The barium titanate particles have a content of at least 5 parts by mass and no greater than 45 parts by mass relative to 100 parts by mass of the coating resin. A rate of a mass of the coat layers to a mass of the carrier cores is greater than 0.0% by mass and no greater than 4.9% by mass. The carrier particles have a shape factor of at least 34.0 and no greater than 85.0.

Advantageous Effects of Invention

According to the present invention, the two-component developer can contribute to excellent fog resistance, stable formation of images with desired image density, reduction of image density differences within formed images, and inhibition of occurrence of image defects resulting from cleaning failure.

BRIEF DESCRIPTION OF DRAWINGS

FIGURE is a diagram illustrating a two-component developer according to an embodiment of the present invention.

DESCRIPTION OF EMBODIMENTS

The meanings of the terms used in the present description and measurement methods are described first. A toner is a collection (e.g., a powder) of toner particles. An external additive is a collection (e.g., a powder) of external additive particles. A carrier is a collection (e.g., a powder) of carrier particles. Unless otherwise stated, evaluation results (values indicating shape or physical properties) for a powder (specific examples include a powder of toner particles, a powder of external additive particles, and a powder of carrier particles) are number averages of values as measured for a suitable number of particles selected from the powder. The "main component" of a material means a component most abundant in the material in terms of mass unless otherwise stated. The level of hydrophobicity (or hydrophilicity) can be expressed by a contact angle of a water droplet (ease of getting wet with water), for example. A lager contact angle of a water droplet indicates a higher level of hydrophobicity. The term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. The term "(meth)acryl" may be used as a generic term for both acryl and methacryl. The term "(meth)acrylonitrile" may be used as a generic term for both acrylonitrile and methacrylonitrile. One type of each component described in the present specification may be used independently, or two or more types of the component may be used in combination.

The measurement value for volume median diameter (D50) of a powder is a median diameter of the powder in terms of volume as measured using a laser diffraction/scattering type particle size distribution analyzer ("LA-950", product of HORIBA, Ltd.) unless otherwise stated. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average value of equivalent circle diameters of 100 primary particles, for example. The softening point (Tm) is a value as measured using a capillary rheometer ("CFT-500D", product of Shimadzu Corporation) unless otherwise stated. On an S-shaped curve (vertical axis: temperature, horizontal axis: stroke) as plotted using the capillary rheometer, the softening point corresponds to the temperature corresponding to a stroke value of "(base line stroke value+maximum stroke value)/2". The melting point (Mp) is a temperature at a maximum endothermic peak on an endothermic curve (vertical axis: heat flow (DSC signal), horizontal axis: temperature) as plotted using a differential scanning calorimeter ("DSC-6220", product of Seiko Instruments Inc.) unless otherwise state. The endothermic peak appears due to melting of the crystallization site. The glass transition point (Tg) is a value as measured in accordance with "Japanese Industrial Standard (JIS) K7121-2012" using a differential scanning calorimeter ("DSC-6220", product of Seiko Instruments Inc.) unless otherwise stated. The glass transition point corresponds to the temperature corresponding to a point of inflection (specifically, an intersection point of an extrapolated baseline and an extrapolated falling line) caused by glass transition on a heat absorption curve (vertical axis: heat flow (DSC signal), horizontal axis: temperature) as plotted using the differential scanning calorimeter. Measurement values for acid value and hydroxyl value are values as measured in accordance with the "Japanese Industrial Standards (JIS) K0070-1992" unless otherwise stated. Measurement values for mass average molecular weight (Mw) are values as measured by gel permeation chromatography unless otherwise stated. The charge amount (unit: μC/g) is a value as measured in an environment at a temperature of 25° C. and a relative humidity of 50% using a compact toner draw-off charge measurement system ("MODEL 212HS", product of TREK, INC.) unless otherwise stated. Unless otherwise stated, the level of chargeability is the ease of triboelectric charging to a standard carrier provided by The Imaging Society of Japan. For example, a measurement target is stirred together with a standard carrier (anionicity: N-01, cationicity: P-01) provided by The Imaging Society of Japan to triboelectrically charge the measurement target. The charge amount per unit mass of the measurement target is measured before and after triboelectric charging using for example a Q/m meter ("MODEL 212HS", product of TREK, INC.). A larger change in charge amount per unit mass between before and after triboelectric charging indicates a higher chargeability of the measurement target. The meanings of the terms used in the present description and the measurement methods have been described so far.

[Two-Component Developer]

The following describes a two-component developer (also referred to below as a developer) 1 according to an embodiment of the present invention with reference to FIGURE. FIGURE illustrates the developer 1 according to the present embodiment. Note that a plurality of identical elements are indicated by the same hatching and one of these identical elements is labeled with a reference sign while the other identical elements are indicated with the reference sign omitted.

The developer 1 contains a toner and a carrier. The toner contains toner particles 10. The carrier contains carrier particles 20. The toner particles 10 each include a toner mother particle 11 and external additive particles 12. The external additive particles 12 are provided on the surface of the toner mother particle 11. The external additive particles 12 include resin particles 13. The resin particles 13 contain a crosslinked resin including a repeating unit derived from a crosslinking agent. The carrier particles 20 each include a carrier core 21 and a coat layer 22. The coat layer 22 covers the surface of the carrier core 21. The coat layers 22 contain a coating resin and barium titanate particles 23. The coating resin includes a silicone resin. The barium titanate particles 23 have a number average primary particle diameter of at least 100 nm and no greater than 500 nm. The barium titanate particles 23 have a content of at least parts by mass and no greater than 45 parts by mass relative to 100 parts by mass of the coating resin. A rate of the mass of the coat layers 22 to the mass of the carrier cores 21 is greater than 0.0% by mass and no greater than 4.9% by mass. The carrier particles 20 have a shape factor of at least 34.0 and no greater than 85.0.

In the following, the "rate of the mass of the coat layers 22 to the mass of the carrier cores 21" may be referred to as a "coat layer/core rate".

As a result of having the above features, the developer 1 according to the present embodiment can contribute to excellent fog resistance, stable formation of images with desired image density, reduction of image density differences within formed images, and inhibition of occurrence of image defects resulting from cleaning failure. Presumably, the reasons therefor are as follows.

The coat layers 22 of the carrier particles 20 contain barium titanate particles 23 in the developer 1 according to the present embodiment. Since the barium titanate particles 23 being a ferroelectric have a high specific permittivity, the carrier particles 20 containing the barium titanate particles 23 in their coat layers 22 have high charge retention ability. The carrier particles 20 with high charge retention ability can provide a sufficient amount of charge to the toner particles 10 by contact with the toner particles 10. Here, where multiple image printing is performed using an image forming apparatus, the toner concentration in the developer 1 loaded in a development device may vary during printing. However, the carrier particles 20 with high charge retention ability can provide a sufficient amount of charge to the toner particles 10 up to the saturation charge even when the toner concentration in the developer 1 loaded in the development device increases during printing, thereby increasing the number of charged toner particles 10. As a result, variation in charge amount of the toner can be reduced to achieve stable formation of images with desired image density even when the toner concentration in the developer 1 changes. Furthermore, since the carrier particles 20 can provide a sufficient amount of charge to the toner particles 10, a portion of the toner particles 10 whose charge amount is less than a desired value and another portion of the toner particles 10 that are oppositely charged reduces, thereby achieving formation of images with less fog.

The barium titanate particles 23 have a number average primary particle diameter of at least 100 nm and no greater than 500 nm in the developer 1 according to the present embodiment. When the number average primary particle diameter of the barium titanate particles 23 is less than 100 nm, the specific permittivity thereof tends to decrease. As a result of the number average primary particle diameter of the barium titanate particles 23 being set to at least 100 nm, the specific permittivity of the barium titanate particles 23 is sufficiently high. As a result of including the coat layers 22 containing the barium titanate particles 23 with high specific permittivity, the carrier particles 20 can provide a sufficient amount of charge to the toner particles 10. As a result, toner particles 10 whose charge amount is less than the desired value and toner particles 10 that are oppositely charged reduces, thereby achieving formation of images with less fog. As a result of the number average primary particle diameter of the barium titanate particles 23 being set to no greater than 500 nm by contrast, the barium titanate particles 23 will sink into the coat layers 22 and are hardly detached from the coat layers 22. Accordingly, a phenomenon in which the barium titanate particles 23 become detached to be transported to a gap between a photosensitive drum and a cleaning blade can be inhibited. As a result, cleaning failure and ultimately image defects resulting therefrom will hardly occur.

The barium titanate particles 23 have a content of at least 5 parts by mass and no greater than 45 parts by mass relative to 100 parts by mass of the coating resin in the developer 1 according to the present embodiment. As a result of the content of the barium titanate particles 23 being set to at least 5 parts by mass relative to 100 parts by mass of the coating resin, the amount of the barium titanate particles 23 in the coat layers 22 increases to enhance charge retention ability of the carrier particles 20. The carrier particles 20 with high charge retention ability can provide a sufficient amount of charge to the toner particles 10 by contact with the toner particles 10. Therefore, variation in charge amount of the toner can be reduced to achieve stable formation of images with desired image density even when the toner concentration in the developer 1 changes. Furthermore, since the carrier particles 20 can provide a sufficient amount of charge to the toner particles 10, toner particles 10 whose charge amount is less than the desired value and toner particles 10 that are oppositely charged reduces, thereby achieving formation of less fog. As a result of the content of the barium titanate particles 23 being set to no greater than 45 parts by mass relative to 100 parts by mass of the coating resin by contrast, the barium titanate particles 23 will sink into the coat layers 22 and are hardly detached from the coat layers 22. Accordingly, a phenomenon in which the detached barium titanate particles 23 inhibit contact between the toner particles 10 and the carrier particles 20 will hardly occur. Thus, a sufficient amount of charge can be provided to the toner particles 10 from the carrier particles 20. As a result, toner particles 10 whose charge amount is less than the desired value and toner particles 10 that are oppositely charged reduces, thereby achieving formation of less fog.

The carrier particles 20 have a coat layer/core rate of greater than 0.0% by mass and no greater than 4.9% by mass in the developer 1 according to the present embodiment. As a result of the coat layer/core rate being set at no greater than 4.9% by mass, the coat layers 22 can be suitably thin. The coating resin contained in the coat layers 22 is hygroscopic. When the coat layers 22 are suitably thin, the amount of the coating resin decreases to reduce influence (e.g., influence of decreasing triboelectric charge amount of the toner particles 10) on triboelectric charging caused by the coating resin absorbing moisture. Furthermore, as a result of the coat layer/core rate being set to no greater than 4.9% by mass, agglomeration of the carrier particles 20 can be inhibited in formation of the coat layers 22 in a later-described carrier formation process. Non-agglomerated or less agglomerated carrier particles 20 can cause favorable triboelectric charging with a result that the toner particles 10 can be charged to the desired charge amount. As a result, toner particles 10 whose charge amount is less than the desired value and toner particles that are oppositely charged reduces, thereby achieving formation of images with less fog. By contrast, when the coat layer/core rate is 0.0% by mass, no coat layer 22 is present on the carrier particles 20 to come into contact with the toner particles 10, leading to insufficient triboelectric charging to toner particles 10. As a result of the coat layer/core rate being set to greater than 0.0% by mass, the toner particles 10 are triboelectrically charged to a desired level by contacting with coat layer 22. Thus, the toner particles 10 are favorably developed.

The carrier particles 20 in the developer 1 according to the present embodiment have a shape factor of at least 34.0 and no greater than 85.0. The shape factor of the carrier particles 20 is calculated using the formula "shape factor of carrier particles 20=actual carrier particle diameter/calculated carrier particle diameter". The calculated carrier particle diameter in the above formula is calculated using the formula "calculated carrier particle diameter=6/(true specific gravity of carrier particles 20×BET specific surface area of carrier particles 20)". The carrier particles 20 with a shape factor approaching 1.0 have a more spherical shape with smaller unevenness on their surfaces. As a result of the shape factor of the carrier particles 20 being set to at least 34.0, unevenness on the surfaces of the carrier particles 20 become moderately large, enabling recesses on the surfaces of the carrier particles 20 to capture the external additive particles 12 detached from the toner particles 10. As such, influence of the detached external additive particles 12 can be reduced, allowing the carrier particles 20 to charge the toner particles 10 to a desired level within a short period of time, thereby forming images with less fog. Furthermore, the fluidity of the carrier particles 20 is increased by setting the shape factor of the carrier particles 20 to at least 34.0. This can achieve transportation of the developer 1 with high fluidity in a stirring chamber of the development device. Therefore, it prevents the temporary reduction in developer 1 supplied from the developing device to the photosensitive drum caused by temporary delay of transportation of developer 1 in the stirring chamber. As a result, it is possible to minimize the difference in image density within the formed images. As a result of the shape factor of the carrier particles 20 being set to no greater than 85.0 by contrast, the surface irregularities of the carrier particles 20 do not become excessively large, allowing the toner particles 10 to be charged to the desired level. As a result, toner particles 10 whose charge amount is less than the desired value and toner particles 10 that are oppositely charged reduces, thereby achieving formation of images with less fog.

The external additive particles 12 of the toner particles 10 include resin particles 13 that contain a crosslinked resin in the developer 1 according to the present embodiment. The coat layers 22 contain the barium titanate particles 32 which are hard, and therefore the carrier particles 20 are relatively hard. The resin particles 13 of the toner particles 10 function as a spacer in contact between the toner particles 10 and the carrier particles 20. As such, even when the carrier particles 20 are relatively hard, it is possible to inhibit occurrence of a phenomenon in which the external additive particles 12 (e.g., optional external additive particles 14, and particularly, silica particles contributing to charging) become buried in the surfaces of the toner mother particles 11 upon contact with the carrier particles 20. As a result, the charge amount of the toner particles 10 can be prevented from being lower than the desired level. Furthermore, the temperature inside the image forming apparatus may rise during high-speed printing. The resin particles 13 containing the crosslinked resin have a relatively high heat resistance. Therefore, the resin particles 13 can act as a spacer during high-speed printing, facilitating favorable tribo-electrification of the toner particles 10 to the desired level. As a result, toner particles 10 whose charge amount is less than the desired value and toner particles 10 that are oppositely charged can be reduced, thereby achieving formation of images with less fog. Note that the developer 1 of present embodiment exhibits excellent fog resistance in both high-speed printing and normal-speed printing.

The reasons why the developer 1 according to the present embodiment can contribute to excellent fog resistance, stable formation of images with desired image density, reduction of image density differences within formed images, and inhibition of occurrence of image defects resulting from cleaning failure have been described so far.

Furthermore, in addition to the above-described advantages, the coat layers 22 in the developer 1 according to the present embodiment has fewer scratches due to the inclusion of hard barium titanate particles 23. Furthermore, as a result of the shape factor of the carrier particles 20 being set to no greater than 85.0, the carrier particles 20 can maintain their shape even after undergoing multiple rounds of image printing because the coat layers 22 are less scratched. For these reasons, the lifespan of the carrier particles 20 can be prolonged. The following describes the toner and carrier contained in the developer 1 in more detail.

[Toner]

The toner contains toner particles 10. The toner particles 10 each include a toner mother particle 11 and external additive particles 12. The external additive particles 12 are provided on the surface of the toner mother particle 11. The external additive particles 12 and the toner mother particles 11 are described below.

<External Additive Particles>

The external additive particles 12 include resin particles 13. The external additive particles 12 may further include external additive particles (also referred to below as optional external additive particles) 14 other than the resin particles 13 as necessary. The resin particles 13 and the optional external additive particles 14 are described below.

(Resin Particles)

The resin particles 13 contain a crosslinked resin. The crosslinked resin has a repeating unit derived from a crosslinking agent. The main chains of the crosslinked resin are crosslinked to each other via the repeating unit derived from the crosslinking agent. The main chain of the crosslinked resin branches into branched chains through the repeating unit derived from a crosslinking agent. Examples of the repeating unit derived from a crosslinking agent include repeating units derived from compounds having at least two vinyl groups, repeating units derived from tri- or higher-valent carboxylic acid monomers, and repeating units derived from tri- or higher-valent alcohol monomers. The repeating unit derived from a crosslinking agent is preferably a repeating unit derived from a compound having two or more vinyl groups, more preferably a repeating unit derived from a compound (divinyl compound) having two vinyl groups, and particularly preferably a repeating unit derived from divinylbenzene.

Examples of the crosslinked resin contained in the resin particles 13 include polyester resins, styrene-based resins, acrylic acid ester-based resins (specific examples include acrylic acid ester polymers and methacrylic acid ester polymers), olefin-based resins (specific examples include polyethylene resin and polypropylene resin), vinyl resins (specific examples include vinyl chloride resin, polyvinyl alcohol, vinyl ether resin, and N-vinyl resin), polyamide resins, and urethane resins. Any copolymer of these resins, that is, any copolymer (more specific examples include styrene-acrylic resin and styrene-butadiene-based resin) with any repeating unit introduced into any of the resins may be used as the crosslinked resin contained in the resin particles 13.

In order to favorably fix the toner particles 10 to the recording media, the crosslinked resin contained in the resin particles 13 is preferably a styrene acrylic resin (also referred to below as a crosslinked styrene acrylic resin) including a repeating unit derived from a crosslinking agent. The crosslinked styrene acrylic resin is a copolymer of at least one styrene-based monomer, at least one acrylic acid-based monomer, and at least one crosslinking agent. That is, the crosslinked styrene acrylic resin includes at least one repeating unit derived from a styrene-based monomer, at least one repeating unit derived from an acrylic acid-based type monomer, and at least one repeating unit derived from a crosslinking agent.

Examples of the styrene-based monomer include styrene, α-methylstyrene, p-hydroxystyrene, m-hydroxystyrene, vinyltoluene, α-chlorostyrene, o-chlorostyrene, m-chlorostyrene, p-chlorostyrene, and p-ethylstyrene. Styrene is preferable as the styrene-based monomer.

Examples of the acrylic acid-based monomer include (meth)acrylic acid, (meth)acrylonitrile, (meth)acryl acid alkyl esters, and (meth)acrylic acid hydroxyalkyl esters. Examples of the (meth)acryl acid alkyl esters include alkyl esters having a carbon number of at least 1 and no greater than 8 of a (meth)acrylic acid, and more specific examples include methyl (meth)acrylate, ethyl (meth)acrylate, n-propyl (meth)acrylate, iso-propyl (meth)acrylate, n-butyl (meth)acrylate, iso-butyl (meth)acrylate, and 2-ethylhexyl (meth)acrylate. Examples of the (meth)acrylic acid hydroxyalkyl esters include 2-hydroxyethyl (meth)acrylate, 3-hydroxypropyl (meth)acrylate, 2-hydroxypropyl (meth)acrylate, and 4-hydroxybutyl (meth)acrylate. The acrylic acid-based monomer is preferably (meth)acrylic acid alkyl ester, more preferably alkyl ester having a carbon number of at least 1 and no greater than 8 of (meth)acrylic acid, further preferably butyl (meth)acrylate, and still further preferably n-butyl (meth)acrylate or iso-butyl (meth)acrylate.

The crosslinking agent is preferably a compound having two or more vinyl groups, more preferably a compound (divinyl compound) having two vinyl groups, and further preferably divinylbenzene.

In order to increase heat resistance of the resin particles 13, the crosslinked resin contained in the resin particles 13 is preferably a crosslinked styrene acrylic resin, more preferably a styrene acrylic resin including a repeating unit derived from a compound having two or more vinyl groups, further preferably a copolymer of styrene, a divinyl compound, and (meth)acrylic acid alkyl ester, further more preferably a copolymer of styrene, alkyl ester having a carbon number of at least 1 and no greater than 8 of (meth)acrylic acid, and a divinyl compound having a carbon number of at least 10 and no greater than 20, still further more preferably a copolymer of styrene, butyl (meth) acrylate, and divinylbenzene, and particularly preferably a copolymer of styrene, butyl methacrylate, and divinylbenzene.

Increase in the amount (blending ratio) of the crosslinking agent relative to the total amount of a styrene-based monomer, an acrylic acid-based monomer, and the crosslinking agent tends to increase heat resistance of the crosslinked styrene acrylic resin. Furthermore, increase in amount (blending ratio) of the acrylic acid-based monomer relative to the amount of the styrene-based monomer tends to increase the glass transition point of the crosslinked styrene-acrylic resin. In order to balance the heat resistance of the resin particles 13 and the fixability of the toner particles 10 to the recording media, the rate of the amount of the repeating unit derived from a crosslinking agent to the total amount of the repeating unit derived from the styrene-based monomer, the repeating unit derived from the acrylic acid-based monomer, and the repeating unit derived from the crosslinking agent is preferably at least 40% by mol and no greater than 80% by mol, more preferably at least 50% by mol and no greater than 70% by mol, and further preferably at least 50% by mol and no greater than 60% by mol. For the same purpose as above, the rate of the amount of the repeating unit derived from the styrene-based monomer to the total amount of the repeating unit derived from the styrene-based monomer, the repeating unit derived from the acrylic acid-based monomer, and the repeating unit derived from the crosslinking agent is preferably at least 4% by mol and no greater than 12% by mol, more preferably at least 6% by mol and no greater than 10% by mol, and further preferably at least 8% by mol and no greater than 10% by mol. For the same purpose as above, the rate of the amount of the repeating unit derived from the acrylic acid-based monomer to the total amount of the repeating unit derived from the styrene-based monomer, the repeating unit derived from the acrylic acid-based monomer, and the repeating unit derived from the crosslinking agent is preferably at least 16% by mol and no greater than 48% by mol, more preferably at least 24% by mol and no greater than 40% by mol, and further preferably at least 32% by mol and no greater than 40% by mol. The resin particles 13 may contain only the crosslinked resin, or it may further contain a resin other than the crosslinked resin in addition to the crosslinked resin.

In order to enhance the spacer function and in order that the toner has excellent heat-resistance preservability, the resin particles 13 have a number average primary particle diameter of preferably at least 30 nm and no greater than 120 nm, more preferably at least 40 nm and no greater than 100 nm, and further preferably at least 60 nm and no greater than 80 nm. The number average primary particle diameter of the resin particles 13 can be measured using a scanning electron microscope, for example.

The number average primary particle diameter of the resin particles 13 can be adjusted for example by changing the reaction time and the stirring speed in polymerization reaction of the monomers. The longer the reaction time is, the larger the number average primary particle diameter of the resin particles 13 tends to be. Also, the lower the stirring speed is, the larger the number average primary particle diameter of the resin particles 13 tends to be. Table 1 shows reaction examples A to E of the polymerization reaction of the monomers. Reaction examples A to E indicate the relationship between the number average primary particle diameter of the resin particles 13 obtained by the polymerization reaction and the reaction temperature, the reaction time, and the stirring speed in the polymerization reaction of the monomers. In Table 1, "Diameter" indicates the number average primary particle diameter of the resin particles 13.

TABLE 1

| Reaction example | Reaction temperature [° C.] | Reaction time [hour] | Stirring speed [rpm] | Diameter [nm] |
|---|---|---|---|---|
| A | 100 | 3 | 1000 | 50 |
| B | 100 | 5 | 600 | 160 |
| C | 100 | 4 | 900 | 80 |
| D | 100 | 3 | 1400 | 30 |
| E | 100 | 5 | 450 | 250 |

The amount of resin particles 13 is preferably at least 0.1 parts by mass and no greater than 10.0 parts by mass relative to 100.0 parts by mass of the toner mother particles 11, and more preferably at least 0.3 parts by mass and no greater than 1.0 parts by mass, and further preferably at least 0.4 parts by mass and no greater than 1.0 parts by mass.

(Optional External Additive Particles)

Examples of the optional external additive particles 14 include silica particles, alumina particles, magnesium oxide particles, and zinc oxide particles. The optional external additive particles 14 may be surface-treated. For example, when silica particles are used as the optional external additive particles 14, either or both hydrophobicity and positive chargeability may be imparted to the surfaces of the silica particles with a surface treatment agent. The optional external additive particles 14 have a number average primary particle diameter of preferably at least 1 nm and no greater than 60 nm, and more preferably at least 5 nm and no greater than 25 nm. The amount of the optional external additive particles 14 is preferably at least 0.1 parts by mass and no greater than 10.0 parts by mass relative to 100.0 parts by mass of the toner mother particles 11, and more preferably at least 1.0 parts by mass and no greater than 2.0 parts by mass.

<Toner Mother Particles>

The toner mother particles 11 contain at least one selected from the group consisting of a binder resin, a colorant, a charge control agent, and a releasing agent, for example. The following describes the binder resin, the colorant, the charge control agent, and the releasing agent.

(Binder Resin)

In order that the toner has excellent low-temperature fixability, the toner mother particles 11 preferably contain a thermoplastic resin as the binder resin, and more preferably contain a thermoplastic resin at a rate of at least 85% by mass of the total of the binder resin. Examples of the thermoplastic resins include polyester resins, styrene-base resins, acrylic ester-base resins (more specifically, acrylic ester polymers, methacrylic ester polymers, etc.), and olefin-base resins (more specifically, polyethylene resin, polypropylene resin, etc.), vinyl resins (more specifically, vinyl chloride resin, polyvinyl alcohol, vinyl ether resin, N-vinyl resin, etc.), polyamide resins, and urethane resins. Furthermore, copolymers of these resins, that is, copolymers (more specifically, styrene-acrylic resins, styrene-butadiene resins, etc.) in which any repeating unit have been introduced into any of the above resins can also be used as the binder resin.

The binder resin is preferably a polyester resin. The polyester resin is a polymer of at least one polyhydric alcohol monomer and at least one polybasic carboxylic acid monomer. Note that a polybasic carboxylic acid derivative (specific examples include an anhydride of polybasic carboxylic acid and a polybasic carboxylic acid halide) may be used instead of the polybasic carboxylic acid monomer.

Examples of the polyhydric alcohol monomer include diol monomers, bisphenol monomers, and tri- or higher-hydric alcohol monomers.

Examples of the diol monomers include ethylene glycol, diethylene glycol, triethylene glycol, 1,2-propanediol, 1,3-propanediol, 1,4-butanediol, neopentyl glycol, 2-butene-1,4-diol, 1,5-pentanediol, 1,6-hexanediol, 1,4-cyclohexanedimethanol, 1,4-benzenediol, dipropylene glycol, polyethylene glycol, polypropylene glycol, and polytetramethylene glycol.

Examples of the bisphenol monomers include bisphenol A, hydrogenated bisphenol A, bisphenol A ethylene oxide adducts, and bisphenol A propylene oxide adducts.

Examples of the tri- or higher hydric alcohol monomers include sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the polybasic carboxylic acid monomer include dibasic carboxylic acid monomers and tri- or higher-basic carboxylic acid monomers.

Examples of the dibasic carboxylic acid monomers include maleic acid, fumaric acid, citraconic acid, itaconic acid, glutaconic acid, phthalic acid, isophthalic acid, terephthalic acid, 5-sulfoisophthalic acid, sodium 5-sulfoisophthalic acid, cyclohexanedicarboxylic acid, adipic acid, sebacic acid, azelaic acid, malonic acid, succinic acid, alkyl succinic acids, and alkenyl succinic acids. Examples of the alkyl succinic acids include n-butylsuccinic acid, isobutylsuccinic acid, n-octylsuccinic acid, n-dodecylsuccinic acid, and isododecylsuccinic acid. Examples of the alkenyl succinic acids include n-butenylsuccinic acid, isobutenylsuccinic acid, n-octenylsuccinic acid, n-dodecenylsuccinic acid, and isododecenylsuccinic acid.

Examples of the tri- or higher-basic carboxylic acid monomers include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

Preferably, the polyester resin is a polymer of a bisphenol monomer, a dibasic carboxylic acid monomer, and a tribasic carboxylic acid monomer. More preferably, the polyester resin is a polymer of a bisphenol A alkylene oxide adduct, a dicarboxylic acid having a carbon number of at least 3 and no greater than 6, and an aryltricarboxylic acid. The polyester resin is further preferably a polymer of a bisphenol A ethylene oxide adduct, a bisphenol A propylene oxide adduct, fumaric acid, and trimellitic acid.

The polyester resin is preferably a non-crystalline polyester resin. For many non-crystalline polyester resins, it is often not possible to determine a clear melting point. As such, a polyester resin for which no clear endothermic peak cannot be determined on an endothermic curve measured using a differential scanning calorimeter can be determined to be a non-crystalline polyester resin.

The polyester resin has a softening point of preferably at least 50° C. and no greater than 200° C., and more preferably at least 80° C. and no greater than 120° C. The polyester resin has a glass transition point of preferably at least 40° C. and no greater than 100° C., and more preferably is at least 40° C. and no greater than 60° C.

The polyester resin has a mass average molecular weight of preferably at least 10,000 and no greater than 50,000, and more preferably at least 20,000 and no greater than 40,000.

The polyester resin has an acid value of preferably at least 1 mgKOH/g and no greater than 30 mgKOH/g, and more preferably at least 10 mgKOH/g and no greater than mgKOH/g. The polyester resin has a hydroxyl value of preferably at least 1 mgKOH/g and no greater than 50 mgKOH/g, and more preferably at least 20 mgKOH/g and no greater than 40 mgKOH/g.

The amount of the binder resin is preferably at least 85 parts by mass and no greater than 95 parts by mass relative to 100 parts by mass of the toner mother particles 11.

(Colorant)

The colorant can be a known pigment or dye that matches the color of the toner. Examples of the colorant include black colorants, yellow colorants, magenta colorants, and cyan colorants.

Carbon black can for example be used as a black colorant. Alternatively, a black colorant can be used that has been adjusted to a black color using a yellow colorant, a magenta colorant, and a cyan colorant.

Examples of a yellow colorant that can be used include at least one compound selected from the group consisting of a condensed azo compound, an isoindolinone compound, an anthraquinone compound, an azo metal complex, a methine compound, and an arylamide compound. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

Examples of a magenta colorant that can be used include at least one compound selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

Examples of a cyan colorants that can be used include at least one compound selected from the group consisting of a copper phthalocyanine compound, an anthraquinone compound, and a basic dye lake compound. Examples of the cyan colorant include C.I. Pigment Blue (1, 7, 15, 15:1, 15:2, 15:3, 15:4, 60, 62, or 66), Phthalocyanine Blue, C.I. Vat Blue, and C.I. Acid Blue.

The amount of the colorant is preferably at least 1 part by mass and no greater than 20 parts by mass relative to 100 parts by mass of the binder resin.

(Charge Control Agent)

The charge control agent is used for example for the purpose of improving charge stability and a charge rise characteristic of the toner. The charge rise characteristic of the toner is an indicator as to whether the toner can be charged to a specific charge level in a short period of time. Examples of the charge control agent include positive charge control agents and negative charge control agents. When a positive charge control agent is contained in the toner mother particles 11, cationic strength (positive chargeability) of the toner can be increased. When a negative charge control agent is contained in the toner mother particles 11, anionic strength (negative chargeability) of the toner can be increased. Examples of the positive charge control agents include pyridine, nigrosine, and quaternary ammonium salts. Examples of the negative charge control agents include metal-containing azo dyes, sulfo group-containing resins, oil-soluble dyes, naphthenic acid metal salts, acetylacetone metal complexes, salicylic acid-based metal complexes, boron compounds, fatty acid soaps, and long-chain alkyl carboxylates. However, the toner mother particle 11 does not need to contain a charge control agent where sufficient chargeability is ensured in the toner. The amount of the charge control agent is preferably at least 1 part by mass and no greater than 10 parts by mass relative to 100 parts by mass of the binder resin.

(Releasing Agent)

The releasing agent is used for example for the purpose of obtaining a toner excellent in hot offset resistance. Examples of the releasing agent include aliphatic hydrocarbon-based waxes, oxides of aliphatic hydrocarbon-based waxes, plant waxes, animal waxes, mineral waxes, waxes having a fatty acid ester as a main component, and waxes in which a fatty acid ester has been partially or fully deoxidized. Examples of the aliphatic hydrocarbon waxes include polyethylene waxes (e.g., low molecular weight polyethylene), polypropylene waxes (e.g., low molecular weight polypropylene), polyolefin copolymers, polyolefin wax, microcrystalline wax, paraffin wax, and Fischer-Tropsch wax. Examples of the oxides of aliphatic hydrocarbon waxes include oxidized polyethylene waxes and block copolymers of oxidized polyethylene waxes. Examples of the plant waxes include candelilla wax, carnauba wax, Japan wax, jojoba wax, and rice wax. Examples of the animal waxes include bee wax, lanolin, and spermaceti. Examples of the mineral waxes include ozokerite, ceresin, and petrolatum. Examples of the waxes having a fatty acid ester as a main component include montanic acid ester wax and castor wax. Examples of the waxes in which a fatty acid ester has been partially or fully deoxidized include deoxidized carnauba wax. The amount of the releasing agent is preferably at least 1 part by mass and no greater than 20 parts by mass relative to 100 parts by mass of the binder resin.

Note that the toner particles 10 may contain a known additive as necessary. Preferably, the toner particles 10 have a volume median diameter of at least 4 μm and no greater than 12 μm. The toner mother particles 11 have a volume median diameter of preferably at least 4 μm and no greater than 12 μm, and more preferably at least 5 μm and no greater than 9 μm. The toner particles 10 may be a magnetic toner or a non-magnetic toner. When the toner particles 10 are a magnetic toner, the toner mother particles 11 further contain a magnetic powder. The amount of the toner in the developer 1 is preferably at least 1 part by mass and no greater than 15 parts by mass relative to 100 parts by mass of the carrier, and more preferably at least 3 parts by mass and no greater than 10 parts by mass. FIGURE illustrates a non-capsule toner mother particle 11 for ease of description. However, capsule toner mother particles may be used each of which include the toner mother particle 11 illustrated in FIGURE as a toner core and a shell layer covering the toner core. The toner has been descried so far.

[Carrier]

The carrier contains carrier particles 20. The carrier particles 20 each include a carrier core 21 and a coat layer 22 provided on the surface of the carrier core 21. The coat layer 22 covers the surface of the carrier core 21. The coat layer 22 may cover either the entire surface or a part of the surface of the carrier core 21.

As described previously, the coat layer/core rate is greater than 0.0% by mass and no greater than 4.9% by mass. The coat layer/core rate is preferably at least 0.1% by mass, and more preferably at least 0.4% by mass. The coat layer/core rate is preferably no greater than 4.6% by mass, more preferably no greater than 4.4% by mass, further preferably no greater than 4.0% by mass, further more preferably no greater than 3.0% by mass, still further more preferably no greater than 2.0% by mass, even more preferably no greater than 1.4% by mass, still even more preferably no greater than 1.0% by mass, particularly preferably no greater than 0.9% by mass, and more particularly preferably no greater than 0.5% by mass. Note that the coat layer/core rate may be at least 2.1% by mass in another embodiment.

The rate of the mass of the coating resin to the mass of the carrier cores 21 is preferably greater than 0.0% by mass and no greater than 4.0% by mass. The "rate of the mass of the coating resin to the mass of the carrier cores 21" may be referred to below as a "resin/core rate". The resin/core rate is preferably no greater than 3.0% by mass, more preferably no greater than 2.0% by mass, further preferably no greater than 1.4% by mass, still further preferably no greater than 1.0% by mass, further more preferably no greater than 0.9% by mass, still further more preferably no greater than 0.5% by mass. The resin/core rate is preferably at least 0.3% by mass.

Assuming that the carrier cores 21 are true spheres, the mass of the coat layers is preferably at least 0.10 g/m$^2$ and no greater than 1.80 g/m$^2$ per unit area of the surfaces of the carrier cores 21. The "mass of the coat layer 22 per unit area of the surface of the carrier core 21 on the assumption that the carrier cores 21 are true spheres" may be referred to below as a "film mass per unit area". As a result of the film mass per unit area being set to at least 0.10 g/m$^2$, defects such as carrier particles 20 adhering to the photosensitive drum (carrier development) hardly occur. As a result, it is possible to prevent the carrier particles 20 attached to the photosensitive drum from transferring to the transfer section from the photosensitive drum, thereby inhibiting the occurrence of image defects such as void. As a result of the film mass per unit area being set to no greater than 1.80 g/m$^2$, it is possible to moderately reduce the amount of coating resin. This reduces the influence caused by the coating resin that easily absorbs moisture, such as decrease in amount of triboelectric charging of toner particles 10. As a result, toner particles 10 whose charge amount is less than the desired value and toner particles 10 that are oppositely charged can be reduced, thereby achieving formation of images with less fog. In order to inhibit the carrier development, the film mass per unit area is preferably at least 0.20 g/m$^2$, more preferably at least 0.30 g/m$^2$, further preferably at least 0.40 g/m$^2$, still further preferably at least 0.50 g/m$^2$, and particularly preferably at least 0.70 g/m$^2$. In order to form images with less fog, the film mass per unit area is preferably no greater than 1.50 g/m$^2$, more preferably no greater than 1.00 g/m$^2$, further preferably no greater than 0.90 g/m$^2$, and still further preferably no greater than 0.85 g/m$^2$. The film mass per unit area can be adjusted, for example, by changing the coat layer/core rate and the volume median diameter of the carrier cores 21.

The following describes a method for calculating the film mass per unit area. The film mass per unit area is calculated according to the following formulas (2) to (6), (7A), (7B), (8), (9A), and (9B). Formula (7B) is obtained by rewriting formula (7A) using formulas (3), (6), (5), and (4). Formula (9B) is obtained by rewriting formula (9A) using formulas (8) and (7B).

$$r = (\text{volume median diameter} \times 10^{-6})/2 \tag{2}$$

$$A = 4\pi r^2 \tag{3}$$

$$B = 4/3\pi r^3 \tag{4}$$

$$C = B \times s_1 = B \times s_2 \times 10^6 \tag{5}$$

$$X = W/C \tag{6}$$

$$Y = A \times X \tag{7A}$$

$$Y = A \times X = (4\pi r^2) \times (W/C) = 4\pi r^2 \times W/(B \times s_2 \times 10^6) = 4\pi r^2 \times W/(4/3\pi r^3 \times s_2 \times 10^6) = 3W \times 10^{-6}/(r \times s_2) \tag{7B}$$

$$Z = W \times (\text{coat layer/core rate})/100 \tag{8}$$

$$E = Z/Y = \tag{9A}$$

$$E = Z/Y = [W \times (\text{coat layer/core rate})/100]/[3W \times 10^{-6}/(r \times s_2)] = (\text{coat layer/core rate}) \times r \times s_2 \times 10^4/3 \tag{9B}$$

Each symbol in formulas (2) to (6), (7A), (7B), (8), (9A), and (9B) is as follows.

r: radius (unit: m) of one carrier core

Volume median diameter: volume median diameter (unit: μm) of carrier cores

A: surface area (unit: m$^2$) of one carrier core

B: volume (unit: m$^3$) of one carrier core

C: mass (unit: g) of one carrier core $s_1$: true specific gravity (unit: $g/m^3$) of carrier cores $s_2$: true specific gravity (unit: $g/cm^3$) of carrier cores W: mass (unit: g) of carrier cores being a measurement target X: number (unit: pieces) of carrier cores with mass of Wg Y: total surface area (unit: $m^2$) of carrier cores with mass of Wg Z: mass (unit: g) of coat layers relative to carrier cores with mass of Wg E: film mass (unit: $g/m^2$) per unit area Coat layer/core rate: coat layer/core rate (unit: % by mass) of carrier particles described above The method for calculating the film mass per unit area is as follows. First, the volume median diameter of the carrier cores 21 is measured using a laser diffraction/scattering particle size distribution analyzer ("LA-950" product of HORIBA, Ltd.). Furthermore, the true specific gravity $s_2$ of the carrier cores 21 is measured using a dry automatic density meter ("ACCUPYC II 1340 SERIES" product of Micromeritics Instrument Corporation). Next, the radius r of one carrier core 21 is calculated using formula (2) based on the measured volume median diameter of the carrier cores 21. Subsequently, a film mass E per unit area is calculated using formula (9B) based on the calculated radius r of the one carrier core 21, the measured true specific gravity $s_2$ of the carrier cores 21, and the coat layer/core rate of the carrier particles 20. The method for calculating the film mass per unit area has been described so far.

In order to charge the toner to the desired charge amount within a short period of time and form images with less fog, the carrier particles 20 preferably have a BET specific surface area of at least 0.3 $m^2/g$, more preferably at least 0.5 $m^2/g$, further preferably at least 0.6 $m^2/g$, still further preferably at least 0.7 $m^2/g$, even further preferably at least 1.0 $m^2/g$, and particularly preferably at least 1.5 $m^2/g$. For the same purpose as above, the carrier particles 20 preferably have a BET specific surface area of no greater than 5.0 $m^2/g$, more preferably no greater than 4.7 $m^2/g$, further preferably no greater than 4.5 $m^2/g$, still further preferably no greater than 4.0 $m^2/g$, and particularly preferably no greater than 3.5 $m^2/g$. The BET specific surface area of the carrier particles 20 is obtained from the amount of liquid nitrogen adsorbed on the surfaces of the carrier particles 20 measured based on the BET method (nitrogen adsorption specific surface area method) using an automatic specific surface area measuring device.

As described previously, the carrier particles 20 have a shape factor of at least 34.0 and no greater than 85.0. In order to form images with less fog and a small difference in image density, it is preferable for the carrier particles 20 to have a shape factor of at least 35.0. In order to form images with less fog, the carrier particles 20 preferably have a shape factor of no greater than 80.0, more preferably no greater than 70.0, further preferably no greater than 60.0, and particularly preferably no greater than 55.0. The shape factor of the carrier particles 20 is measured, for example, by the method described in Examples. A method for adjusting the shape factor of the carrier particles 20 will be described in <Carrier Formation Process> below.

The flow rate (FR, unit: sec/50 g) of the carrier particles 20 is measured in accordance with the Japanese Industrial Standards (JIS) Z 2502:2012 "Metallic powders—Determination of flow rate by means of a calibrated funnel (Hall Flowmeter)". The flow rate of carrier particles 20 corresponds to the time required to discharge 50 g of the carrier particles 20 from a funnel. The flow rate of the carrier particles 20 is preferably at least 25.0 sec/50 g and no greater than 35.0 sec/50 g, and more preferably at least 26.0 sec/50 g and no greater than 29.0 sec/50 g.

The apparent density (AD, unit: $g/cm^3$) of the carrier particles 20 is measured in accordance with the Japanese Industrial Standards (JIS) Z 2504:2012 "Metallic powders—Determination of apparent density". The apparent density of the carrier particles 20 is preferably at least 1.0 $g/cm^3$ and no greater than 5.0 $g/cm^3$, more preferably at least 2.0 $g/cm^3$ and no greater than 2.6 $g/cm^3$, and further preferably at least 2.3 $g/cm^3$ and no greater than 2.4 $g/cm^3$.

The product (also referred to below as value (FR×AD)) of the flow rate and the apparent density of the carrier particles 20 is preferably at least 50.0 and no greater than 80.0, more preferably at least 52.0 and no greater than 77.0, further preferably at least 55.5 and no greater than 71.0, and still further preferably at least 55.5 and no greater than 62.0. Here, the stirring chamber of the developing device of the image forming apparatus is equipped with, for example, a stirring screw that transports the toner and the carrier while stirring them. The flow rate of the carrier particles 20 is an index that indicates the transport speed of the carrier particles 20 per unit mass by the stirring screw. The apparent density of the carrier particles 20 indicates the mass of the carrier particles per unit volume. Therefore, the product of the flow rate and the apparent density of the carrier particles 20, or value (FR×AD), is an index that indicates the transport speed of the carrier particles 20 per unit volume by the stirring screw. As a result of the value (FR×AD) being at least 50.0, the carrier particles 20 are transported at an appropriate speed by the stirring screw, thereby favorably forming images with a small density difference. As a result of the value (FR×AD) being no greater than 80.0, the carrier particles 20 are not transported too quickly, ensuring sufficient triboelectric charging time for the toner particles 10 through contact with the carrier particles 20. As a result, toner particles 10 whose charge amount is less than the desired value and toner particles 10 that are oppositely charged can be reduced, thereby achieving formation of images with less fog.

Note that the developer 1 according to the present embodiment can be particularly favorably used in an image forming apparatus including a developing device equipped with a stirring screw. The stirring screws provided in the developing device are preferably at least one and no greater than three, and more preferably two.

It is preferable that the carrier particles 20 satisfy formula (1). In formula (1), FR represents the flow rate of the carrier particles 20, AD represents the apparent density of the carrier particles 20, and X represents the shape factor of the carrier particles 20.

$$0.73 \leq FR \times AD/X \leq 2.10 \tag{1}$$

In the following, the "value calculated from the formula 'FR×AD/X'" in formula (1) may be referred to as "value (FR×AD/X)". As described previously, the value (FR×AD) is an index that indicates the transport speed of the carrier particles 20 per unit volume by the stirring screw. Furthermore, as described previously, the shape factor of the carrier particles 20, which indicates the unevenness on the surface of the carrier particles 20, affects both the charging property and fluidity (in turn, transport speed) of the carrier particles 20. The charging property refers to the ability of the carrier particles to charge a toner to a desired charge amount in a short period of time. Based on these facts, the "value (FR×AD/X)" serves as an index indicating the balance between the transport speed and the charging property of the carrier particles 20. In order to optimize the balance between the transport speed and the charging property of the carrier particles to form images with a small density difference, the value (FR×AD/X) is preferably at least 0.73 as shown in formula (1), and more preferably at least 0.95. In order to optimize the balance between the transport speed and the charging property of the carrier particles 20 to form images with a small density difference, the value (FR×AD/X) is preferably no greater than 2.10 as shown in formula (1), and more preferably no greater than 2.00.

The carrier cores 21 and the coat layers 22 of the carrier particles 20 are described next.

<Carrier Cores>

The carrier cores 21 contain a magnetic material, for example. Examples of the magnetic material contained in the carrier cores 21 include metal oxides, and more specific examples include magnetite, maghemite, and ferrite. Ferrite has high fluidity and tends to be chemically stable. As such, the carrier cores 21 preferably contain ferrite in terms of formation of high-quality images over a long period of term. Examples of ferrite include barium ferrite, manganese ferrite (Mn-ferrite), Mn—Zn ferrite, Ni—Zn ferrite, Mn—Mg ferrite, Ca—Mg ferrite, Li ferrite, and Cu—Zn ferrite. The shape of the carrier cores 21 is not limited particularly and may be irregular or spherical. A commercially available product may be used as the carrier cores 21. Alternatively, the carrier cores 21 may be self-made by crushing and sintering the magnetic material.

The carrier cores 21 have a volume median diameter of preferably at least 20.0 μm and no greater than 80.0 μm, more preferably at least 20.0 μm and no greater than 65.0 μm, further preferably at least 20.0 μm and no greater than 60.0 μm, further more preferably at least 20.0 μm and no greater than 50.0 μm, still further preferably at least 20.0 μm and no greater than 40.0 μm, even still further preferably at least 20.0 μm and no greater than 35.0 μm, and particularly preferably at least 25.0 μm and no greater than 35.0 μm. As a result of the volume median diameter of the carrier cores 21 being set to at least 20.0 μm, carrier development can hardly occur. Thus, a phenomenon in which the carrier particles 20 attaching to the photosensitive drum transfers from the photosensitive drum to a transfer section can be inhibited, thereby inhibiting occurrence of image defects such as void. As a result of the volume median diameter of the carrier cores 21 being set to no greater than 80.0 μm by contrast, a fine magnetic brush of the developer 1 can be formed on the circumferential surface of a development roller in image formation, thereby achieving formation of fine texture images. The volume median diameter of the carrier cores 21 is measured by the method described in Examples, for example.

The carrier cores 21 have a saturation magnetization of preferably at least 65 emu/g and no greater than 90 emu/g, and more preferably at least 70 emu/g and no greater than 85 emu/g. As a result of the saturation magnetization of the carrier cores 21 being set to at least 65 emu/g, carrier development will hardly occur. As a result of the saturation magnetization of the carrier cores 21 being set to no greater than 90 emu/g, a fine magnetic brush of the developer 1 can be formed on the circumferential surface of the development roller in image formation, thereby achieving formation of fine texture images. Where the carrier cores 21 contain Mn-ferrite, the higher the percentage content of Mn is, the lower the saturation magnetization of the carrier cores 21 tends to be. Also, where the carrier cores 21 contain Mn—Mg ferrite, the higher the percentage content of the Mg is, the lower the saturation magnetization of the carrier cores 21 tends to be. The saturation magnetization of the carrier cores 21 is measured by the method described in Examples, for example.

The carrier cores 21 preferably have an apparent density of at least $1.20\times10^3$ kg/m$^3$ and no greater than $2.80\times10^3$ kg/m$^3$. The carrier cores 21 preferably have a degree of fluidity of at least 21 sec/50 g and no greater than 50 sec/50 g. The carrier cores 21 preferably have an electrical resistivity of at least $1\times10^2$ Ω·m and no greater than $1\times10^7$ Ω·m.

The carrier cores preferably have a residual magnetization of at least 0.4 Am$^2$/kg and no greater than 10.0 Am$^2$/kg. The carrier cores 21 have a coercive force of at least 5 A/m·$10^3/4\pi$ and no greater than 10 A/m·$10^3/4\pi$. As a result of the coercive force of the carrier cores 21 being set to at least 10 A/m·$10^3/4\pi$, the fluidity of the developer 1 in the developing device increases, allowing the toner particles 10 to be favorably charged to a desired charge amount, thereby forming images with less fog. Residual magnetization and coercive force are determined by continuously applying an external magnetic field within the range of 0 A/m to $79.58\times10^4$ A/m (10,000 Oersteds) in one cycle using, for example, a vibrating sample magnetometer (VSM) designed for room temperature ("VSM-P7" product of Toei Industry Co., Ltd.).

<Coat Layers>

The coat layers 22 contain a coating resin and barium titanate particles 23. Preferably, the coat layers 22 further contain carbon black particles 24. However, the carbon black particles 24 can be dispensed with. The coating resin, the barium titanate particles 23, and the carbon black particles 24 are described below.

(Coating Resin)

The coating resin includes a silicone resin. As a result of the coating resin including a silicone resin, the toner can be triboelectrically charged to the desired charge amount in a favorably manner. Furthermore, as a result of use of a silicone resin as the coating resin, the coat layers 22 can be thinner than those made with a resin (e.g., fluororesin) other than the silicone resin. Thus, the amount of the coating resin contained in the coat layers 22 can be reduced and influence (e.g., influence of decreasing triboelectric charge amount of the toner particles 10) on triboelectric charging caused by the coating resin absorbing moisture can be reduced.

Preferable examples of the silicone resin include epoxy resin modified silicone resins and silicone resins having a methyl group. One examples of the silicone resins having a methyl group is a silicone resin having a methyl group and not having a phenyl group. Another example of the silicone resins having a methyl group is a silicone resin (also referred to below as a "methylphenyl silicone resin") having a methyl group and a phenyl group. The coat layers 22 may contain only a silicone resin as the coating resin or may further contain a resin other than the silicone resin.

(Barium Titanate Particles)

As described previously, the barium titanate particles 23 have a number average primary particle diameter of at least 100 nm and no greater than 500 nm. In order to form images with less fog, the number average primary particle diameter of the barium titanate particles 23 is preferably at least 200 nm. In order to inhibit occurrence of image defects resulting from cleaning failure, the number average primary particle diameter of the barium titanate particles 23 is preferably no greater than 400 nm. The number average primary particle diameter of the barium titanate particles 23 is measured by the method described in Examples, for example.

As described previously, the barium titanate particles 23 have a content of at least parts by mass and no greater than 45 parts by mass relative to 100 parts by mass of the coating resin. The content of the barium titanate particles 23 is preferably at least 25 parts by mass and no greater than 45 parts by mass relative to 100 parts by mass of the coating resin. When the coating resin includes two or more resins, 100 parts by mass of the coating resin means the total mass of the two or more resins being 100 parts by mass.

No particular limitations are placed on a method for producing the barium titanate particles 23, and the method may be hydrothermal synthesis or the oxalate method, for example. Preferably, the method for producing the barium titanate particles 23 is the hydrothermal synthesis. That is, the barium titanate particles 23 are preferably made from a hydrothermal compound. Having voids thereinside, barium titanate particles 23 produced by the hydrothermal synthesis have a smaller true specific gravity than those produced by the oxalate method. Furthermore, the barium titanate particles 23 produced by the hydrothermal synthesis have a sharp particle diameter distribution. For these reasons, the barium titanate particles 23 produced by the hydrothermal synthesis easily disperse uniformly in the coating resin, thereby easily obtaining a carrier with uniform charge imparting ability. As a result, the toner is quickly charged by friction with the carrier and images with further less fog can be formed.

The hydrothermal synthesis includes a hydrothermal reaction process and a thermal treatment process, for example. In the hydrothermal reaction process, a water-soluble barium salt is added to a titanium oxide dispersion in which titanium oxide particles are dispersed and the resultant dispersion is heated to cause a hydrothermal reaction. Barium titanate hydrothermally synthesized particles are obtained in the manner described above. In the thermal treatment process, the barium titanate hydrothermally synthesized particles are heat-treated to obtain the barium titanate particles 23. The heating temperature in the hydrothermal reaction process is preferably at least 80° C. The heating temperature in the thermal treatment process is preferably at least 650° C. and no greater than 850° C. The number average primary particle diameter of the barium titanate particles 23 can be adjusted for example by changing the heating temperature and the time for the hydrothermal reaction in the hydrothermal reaction process. For example, the higher the heating temperature in the hydrothermal reaction process is, the larger the number average primary particle diameter of the barium titanate particles 23 is. Also, the longer the time for the hydrothermal reaction is, the larger the number average primary particle diameter of the barium titanate particles 23 is.

(Carbon Black Particles)

The carbon black particles 24 are conductive. As such, charge can smoothly move from the carrier particles 20 to the toner particles 10 as a result of the coat layers 22 containing the carbon black particles 24. Thus, the toner particles 10 can be charged to the desired charge amount, thereby achieving formation of images with less fog. Furthermore, variation in charge amount of the toner can be reduced to achieve stable formation of images with desired image density even when the toner concentration in the developer 1 changes.

The carbon black particles 24 have a number average primary particle diameter of preferably at least 10 nm and no greater than 50 nm, and more preferably at least 20 nm and no greater than 40 nm. The carbon black particles 24 have a DBP oil absorption of preferably at least 50 $cm^3/100$ g and no greater than 700 $cm^3/100$ g, and more preferably at least 100 $cm^3/100$ g and no greater than 600 $cm^3/100$ g. The carbon black particles 24 have a BET specific surface area of preferably at least 100 $m^2/g$ and no greater than 2000 $m^2/g$, and more preferably at least 100 $m^2/g$ and no greater than 200 $m^2/g$ or at least 1200 $m^2/g$ and no greater than 1500 $m^2/g$.

As a result of the coat layers 22 containing the barium titanate particles 23, the electric resistance of the carrier particles 20 can be moderately low. As such, the electric resistance of the carrier particles 20 can be moderately low even when the amount of the carbon black particles 24 being conductive is small. Since the amount of the carbon black particles 24 can be reduced, occurrence of color turbidity can be inhibited in images formed using the developer 1 containing the carrier particles 20. The amount of the carbon black particles 24 is preferably at least 1 part by mass and no greater than 10 parts by mass relative to 100 parts by mass of the coating resin, more preferably at least 3 parts by mass and no greater than 9 parts by mass, and further preferably at least 3 parts by mass and no greater than 6 parts by mass or at least 6 parts by mass and no greater than 9 parts by mass.

Note that the carrier particles 20 may contain a known additive as necessary. Preferably, the carrier particles 20 have a volume median diameter of at least 25 μm and no greater than 100 μm. The carrier has been descried so far.

[Developer Production Method]

The following describes one example of a method for producing the developer 1 according to the present embodiment. The method for producing the developer 1 according to the present embodiment includes a toner formation process, a carrier formation process, and a process of mixing a toner and a carrier, for example.

<Toner Formation Process>

In the toner formation process, for example, the binder resin, the colorant, the charge control agent, and the releasing agent are mixed to obtain a mixture. The mixture is melt-kneaded to obtain a melt-kneaded product. The melt-knead product is pulverized to obtain a pulverized product. The pulverized product is classified to obtain the toner mother particles 11. The toner mother particles 11 and the external additive particles 12 (the resin particles 13 and the optional external additive particles 14) are mixed using a mixer. Through mixing, the external additive particles 12 are attached to the surfaces of the toner mother particles 11. Thus, a toner containing the toner particles is obtained. The external additive particles 12 are mixed preferably under a condition that the external additive particles 12 are not entirely buried in the toner mother particles 11. The external additive particles 12 are attached to the surfaces of the toner mother particles 11 by physical bond (physical force) rather than chemical bond.

<Carrier Formation Process>

In the carrier formation process, the coat layers 22 are formed on the surfaces of the carrier cores 21 to obtain a carrier containing the carrier particles 20. For example, a coating liquid containing the coating resin, the barium titanate particles 23, and the optional carbon black particles 24 is sprayed on the carrier cores 21 in a fluid layer. >Next, the carrier cores 21 on which the coating liquid has been sprayed are heated at a first specific temperature (also referred to below as a specific drying temperature) to dry the coating liquid attached to the surfaces of the carrier cores 21, thereby obtaining a dried product. Next, the dried product is heated at a second specific temperature (also referred to below as a specific baking temperature) using an electric furnace to harden the coating resin contained in the coating liquid on the surfaces of the carrier cores 21. Thus, the coat layers 22 are formed on the surfaces of the carrier cores 21. Preferably, the specific drying temperature is at least 70° C. and no greater than 80° C. Preferably, the specific baking temperature is at least 200° C. and no greater than 300° C.

The shape factor of the carrier particles 20 can be adjusted, for example, by changing the specific drying temperature. A higher specific drying temperature dries the coating liquid before the coating liquid spreads over the entire surface of the carrier cores 21. Therefore, at a higher specific drying temperature, the coat layers 22 are formed locally on the surfaces of the carrier cores 21 rather than over the entire surface thereof, which tends to increase the shape factor of the carrier particles 20.

<Process of Mixing Toner and Carrier>

In the process of mixing a toner and a carrier, the toner and the carrier are mixed using a mixer to obtain the developer 1.

EXAMPLES

The following provides more specific description of the present invention through use of examples. However, the present invention is not limited to the scope of the examples.

<Carrier Preparation>

Carriers (CA-1) to (CA-23) and (CB-1) to (CB-9) were prepared. The compositions of these carriers are shown in Tables 2 to 4 described later. Note that the carriers (CA-1) to (CA-23) and (CB-1) to (CB-9) were used for preparing the developers (A-1) to (A-23) and (B-1) to (B-9), respectively. To aid understanding, carriers with the same composition are shown in Tables 2 to 4 with different carrier numbers corresponding to the numbers of the developers.

(Preparation of Carrier (CA-1))

Using a homo-mixer, 361.2 g of a silicone resin solution ("KR-255", product of Shin-Etsu Chemical Co., Ltd., solid concentration: 50% by mass, solid content amount: 180.6 g), 9.0 g of barium titanate ("BT-01", product of SAKAI CHEMICAL INDUSTRY CO., LTD., barium titanate produced by the hydrothermal synthesis, number average primary particle diameter: 102 nm), 5.4 g of carbon black ("KETJEN BLACK EC-300J", product of Lion Specialty Chemicals Co., Ltd.), and 1,444.8 g of toluene were mixed to obtain a coating liquid.

While 5000 g of carrier cores are allowed to flow, the coating liquid was sprayed on the carrier cores using a fluidized bed coating apparatus ("FD-MP-01 D", product of Powrex Corporation). Thus, carrier cores coated with the coating liquid were obtained. The coating conditions included a supply air temperature (corresponding to the specific drying temperature described in the embodiment) of 75° C., supply air flow rate of 0.3 $m^3$/min, and a rotor rotational speed of 400 rpm. The carrier cores used were manganese ferrite cores (product of DOWA IP CREATION CO., LTD., volume median diameter: 20.3 μm, saturation magnetization: 67 emu/g). The carrier cores coated with the coating liquid were baked at a temperature of 200° C. (corresponding to the specific baking temperature described in the embodiment) for 1 hour using an electric furnace. In the manner described above, coat layers were formed on the surfaces of the carrier cores to obtain a carrier (CA-1).

(Preparation of Carriers (CA-2) to (CA-23) and (CB-1) to (CB-9))

Carriers (CA-2) to (CA-23) and (CB-1) to (CB-8) were prepared according to the same method as that for preparing the carrier (CA-1) in all aspects other than the following changes. That is, the coating resin solutions shown in Tables 2 to 4 were used in amounts to give the solid content amounts shown in Tables 2 to 4. Barium titanates with number average primary particle diameters shown in Tables 2 to 4 produced by the methods shown in Tables 2 to 4 were used in amounts shown in Tables 2 to 4. The carbon blacks shown in Tables 2 to 4 were used in amounts shown in Tables 2 to 4. Carrier cores with volume median diameters and saturation magnetizations shown in Tables 2 to 4 were used. With respect to the carrier (CB-9), carrier cores with a volume median diameter and saturation magnetization shown in Table 4 with no coat layers were used as carrier particles.

Details of the coating resin solutions and carbon blacks shown in Tables 2 to 4 are described later in explanation of the terms in Tables 2 to 4. The barium titanates with number average primary particle diameters shown in Tables 2 to 4 produced by the methods shown in Tables 2 to 4 used were those described below. Any types of the carrier cores with the volume median diameters and the saturation magnetizations shown in Tables 2 to 4 were manganese ferrite cores produced by DOWA IP CREATION CO., LTD. Note that the coercive force of the carrier cores used for preparing the carriers (CA-1) to (CA-23) and (CB-1) to (CB-9) was 8 (unit: Oe, or A/m·$10^3/4\pi$).

Barium titanate (production method: hydrothermal synthesis, number average primary particle diameter: 102 nm): "BT-01" produced by SAKAI CHEMICAL INDUSTRY CO., LTD.

Barium titanate (production method: hydrothermal synthesis, number average primary particle diameter: 304 nm): "BT-03" produced by SAKAI CHEMICAL INDUSTRY CO., LTD.

Barium titanate (production method: hydrothermal synthesis, number average primary particle diameter: 495 nm): "BT-05" produced by SAKAI CHEMICAL INDUSTRY CO., LTD.

Barium titanate (production method: hydrothermal synthesis, number average primary particle diameter: 76 nm): particle size adjusted product produced by SAKAI CHEMICAL INDUSTRY CO., LTD.

Barium titanate (production method: hydrothermal synthesis, number average primary particle diameter: 687 nm): "BT-07" produced by SAKAI CHEMICAL INDUSTRY CO., LTD.

Barium titanate (production method: oxalate method, number average primary particle diameter: 304 nm): 0.3-μm product of "BESPA (Oxalate Method Barium Titanate)" produced by NIPPON CHEMICAL INDUSTRIAL CO., LTD.

<Resin Particle Preparation>

Resin particles (R1) to (R6) for use as external additives of toners were synthesized by the following methods.

(Synthesis of Resin Particles (R1))

A glass-made reaction vessel equipped with a thermometer (thermocouple), a stirring device, a reflux condenser, and a nitrogen gas inlet tube was set in a water bath set at 80° C. A solution was obtained by adding 300 parts by mass of ion exchange water and 1 part by mass of di-tert-butyl peroxide into the reaction vessel. While the resultant solution was kept at a temperature of 80° C. and stirred, 0.2 parts by mass of ammonium persulfate and 60 parts by mass of a monomer mixture were dripped into the solution over 1 hour in a nitrogen gas atmosphere. The monomer mixture was a mixture of 10% by mol of styrene, 40% by mol of butyl methacrylate, and 50% by mol of divinylbenzene. Next, a polymerization reaction of the contents of the reaction vessel was caused under stirring. The reaction conditions of the polymerization reaction included a reaction temperature of 100° C., a reaction time of 3 hours, and a stirring speed of 1400 rpm. An emulsion solution obtained by the reaction was dried to obtain resin particles (R1). The resin particles (R1) had a number average primary particle diameter of 30 nm.

(Synthesis of Resin Particles (R2) to (R6))

Resin particles (R2) to (R6) were synthesized according to the same method as that for synthesizing the resin particles (R1) in all aspects other than that the number average primary particle diameter was changed from 30 nm to those shown in Tables 8 to by changing the reaction time and the stirring speed in the polymerization reaction. The reaction time and the stirring speed were set with reference to the method for adjusting the number average primary particle diameter of the resin particles described in the embodiment.

<Synthesis of Non-crystalline Polyester Resin (PS1)>

A non-crystalline polyester resin (PS1) for used as a binder resin of toner mother particles of toner particles was synthesized by the following method. First, a reaction vessel equipped with a thermometer (thermocouple), a dewatering conduit, a nitrogen inlet tube, and a stirring device (stirring impeller) was set in an oil bath. Into the reaction vessel, 1575 g of a bisphenol A propylene oxide adduct (BPA-PO), 163 g of a bisphenol A ethylene oxide adduct (BPA-EO), 377 g of fumaric acid, and 4 g of a catalyst (dibutyltin oxide) were added. Subsequently, after a nitrogen atmosphere was created in the reaction vessel, the internal temperature of the reaction vessel was raised to 220° C. using the oil bath while stirring the contents thereof. The contents of the reaction vessel were polymerized for 8 hours under conditions of the nitrogen atmosphere and a temperature of 220° C. while by-product water was removed. Subsequently, after the internal pressure of the reaction vessel was reduced, the contents of the reaction solution were further polymerized for 1 hour under conditions of the reduced pressure atmosphere (pressure: 60 mmHg) and a temperature of 220° C. Subsequently, after the internal temperature of the reaction vessel was reduced to 210° C., 336 g of trimellitic anhydride was added into the reaction vessel. Thereafter, the contents of the reaction vessel were caused to react under conditions of the reduced pressure atmosphere (pressure: 60 mmHg) and a temperature of 210° C. The reaction time for the reaction was adjusted so that the non-crystalline polyester resin (PS1) being a reaction product had the following physical properties. Thereafter, the reaction product was taken out of the reaction vessel and cooled to obtain a non-crystalline polyester resin (PS1) with the following physical properties. Note that the resultant polyester resin (PS1) was determined to be non-crystalline because no clear endothermic peak was observed on the endothermic curve plotted using a differential scanning calorimeter and no clear melting point was determined.

(Physical Properties of Non-crystalline Polyester Resin (PS-1))

Softening point (Tm): 100° C.
Glass transition point (Tg): 50° C.
Mass average molecular weight (Mw): 30,000
Acid value: 15 mgKOH/g
Hydroxyl value: 30 mgKOH/g <Toner Preparation>

Toners (TA-1) to (TA-23) and (TB-1) to (TB-9) were prepared. The compositions of these toners are shown in Tables 8 to 10 described later. Note that the toners (TA-1) to (TA-23) and (TB-1) to (TB-9) were used for preparing the developers (A-1) to (A-23) and (B-1) to (B-9), respectively. To aid understanding, even toners with the same composition are shown in Tables 8 to 10 as toners with different toner numbers corresponding to the numbers of the developers.

(Preparation of Toner (TA-1))

Using an FM mixer ("FM-10B", product of Nippon Coke & Engineering Co., Ltd.), 100 parts by mass of a binder resin, 4 parts by mass of a colorant, 1 part by mass of a charge control agent, and 5 parts by mass of a releasing agent were mixed to obtain a mixture. The binder resin used was the non-crystalline polyester resin (PS1) obtained in <Synthesis of Non-crystalline Polyester Resin (PS1)> described above. The colorant used was a copper phthalocyanine blue pigment (C.I. Pigment Blue 15:3). The charge control agent used was a quaternary ammonium salt ("BONTRON (registered Japanese trademark) P-51", product of ORIENT CHEMICAL INDUSTRIES CO., LTD.). The releasing agent used was a carnauba wax ("SPECIAL CARNAUBA WAX No. 1", product of S. Kato & Co.). The resultant mixture was melt-kneaded using a twin screw extruder ("MODEL PCM-30", product of Ikegai Corp.) to obtain a melt-kneaded product. The melt-kneading was carried out under conditions of a set temperature of 120° C., a rotational speed of 150 rpm, and a processing amount of 5 kg/hour. The melt-kneaded product was pulverized using a mechanical pulverizer ("TURBO MILL", product of FREUND-TURBO CORPORATION) to obtain a pulverized product. The pulverized product was classified using a classifying apparatus ("ELBOW-JET", product of Nittetsu Mining Co., Ltd.). Through the above, toner mother particles in a powder state with a volume median diameter of 6.8 μm were obtained.

Using an FM mixer ("FM-10B", product of Nippon Coke & Engineering Co., Ltd.), 100.0 parts by mass of the toner mother particles, 1.5 parts by mass of silica particles, and 0.4 parts by mass of the resin particles (R1) were mixed for 5 minutes under a condition of 4,000 rpm. The silica particles used were "AEROSIL (registered Japanese trademark) REA90" (dry silica particles rendered positively chargeable through surface treatment, number average primary particle diameter 20 nm) produced by Nippon Aerosil Co., Ltd. The resultant mixture was sifted using a 200-mesh sieve (opening 75 μm) to obtain a toner (TA-1).

(Preparation of Toners (TA-2) to (TA-23) and (TB-1) to (TB-9))

Toners (TA-2) to (TA-23), (TB-1) to (TB-6), (TB-8), and (TB-9) were prepared according to the same method as that for preparing the toner (TA-1) in all aspects other than that the resin particles shown in Tables 8 to 10 were used in amounts shown in Tables 8 to 10. A toner (TB-7) was prepared according to the same method as that for preparing toner (TA-1) in all aspects other than that no resin particles were used.

<Developer Preparation>

Using a shaker mixer ("TURBULA (registered Japanese trademark) MIXER T2F", product of Willy A. Bachofen AG (WAB)), 6 parts by mass of any of the toners and 100 parts by mass of any of the carriers were mixed for 30 minutes to obtain a developer with a toner concentration of 6% by mass. Note that the toners and the carriers shown in Tables 8 to 10 were used in the developer preparation. For example, the toner (TA-1) and the carrier (CA-1) shown in the column titled "Developer (A-1)" in Table 8 were used in the preparation of the developer (A-1).

<Saturation Magnetization Measurement>

The saturation magnetization of each type of the carrier cores was measured under a condition of an external magnetic field of 3000 (unit: Oe) using a high-sensitivity vibrating sample magnetometer ("VSM-P7", product of Toei Industry Co., Ltd.). The measurement results are shown below in Tables 2 to 4.

<Volume Median Diameter Measurement>

The volume median diameter (i.e., median diameter) of each type of the carrier cores was measured using a laser diffraction/scattering type particle size distribution analyzer ("LA-950", product of HORIBA, Ltd.). The measurement results are shown below in Tables 2 to 4.

<Number Average Primary Particle Diameter Measurement>

The number average primary particle diameters of each type of the barium titanate particles, each type of the silica particles, and each type of the resin particles were measured using a scanning electron microscope ("JSM-7600F", product of JEOL Ltd., field emission scanning electron microscope). In the number average primary particle diameter measurement, the equivalent circle diameters (Heywood diameters: diameters of circles having the same areas as projected areas of primary particles) of 100 primary particles were measured and a number average thereof was obtained. Tables 2 to 4 show the results of the number average primary particle diameter measurement for the barium titanate particles. Tables 8 to 10 show the results of the number average primary particle diameter measurement for the silica particles and the resin particles.

<Measurement of Film Mass Per Unit Area>

First, the true specific gravity (unit: g/cm$^3$) of the carrier cores was measured using a dry automatic density meter ("ACCUPYC II 1340 SERIES", product of Micromeritics Instrument Corporation, accessories: Multivolume kit, measurement principle: dry density measurement using constant volume expansion method). A film mass per unit area was calculated according to formula (2) and formula (9B) described in the embodiment, based on the true specific gravity of the carrier cores measured as above, the volume median diameter of the carrier cores measured in the above-described <Measurement of Volume Median Diameter>, and the coat layer/core rate shown in Tables 2 to 4. Calculated film masses per unit area are shown in Tables 5 to 7.

For example, the method for calculating a film mass per unit area of the carrier (CA-1) was as follows. As shown in Table 2, the volume median diameter of the carrier cores of the carrier (CA-1) was 20.3 μm, and the coat layer/core rate was 3.9% by mass. Furthermore, the true specific gravity $s_2$ of the carrier cores measured by the above method was 5 g/cm$^3$. From formula (2), it was calculated that r=(volume median diameter×$10^{-6}$)/2=(20.3×$10^{-6}$)/2=10.15×$10^{-6}$. Next, from formula (9B), it was calculated that E=(coat layer/core rate)×r×$s_2$×$10^4$/3=3.9×(10.15×$10^{-6}$)×5×$10^4$/3≈0.66. Note that the calculation results were rounded off to the third decimal place. Thus, the film mass per unit area of the carrier (CA-1) was 0.66.

<Measurement of Flow Rate (FR) of Carrier Particles>

The flow rate of the carrier particles was measured in accordance with the Japanese Industrial Standards (JIS) Z 2502:2012 "Metallic powders-Determination of flow rate by means of a calibrated funnel (Hall flowmeter)". The measurement was carried out in an environment at a temperature of 22° C. and a relative humidity of 50%. Specifically, a metal funnel (cone angle: 60°, orifice diameter: 2.5 mm, orifice length: 3.2 mm) was prepared. Then, 50 g of a sample (carrier particles) was charged into the funnel with the orifices plugged. Subsequently, the stopwatch was started when the orifices of the funnel were opened (measurement started), and it was stopped when the last carrier particle exited from an orifice (measurement ended). The time (carrier particle discharge time) measured from the start of the measurement to the end of the measurement by the stopwatch was defined as the flow rate of the carrier particles (unit: sec/50 g). The measurement results are shown in Tables 5 to 7.

<Measurement of Apparent Density (AD) of Carrier Particles>

The apparent density (unit: g/cm$^3$) of the carrier particles was measured in accordance with the Japanese Industrial Standards (JIS) Z 2504:2012 "Metallic powders—Determination of apparent density". The measurement was carried out in an environment at a temperature of 22° C. and a relative humidity of 50%.

<BET Specific Surface Area Measurement>

Nitrogen was adsorbed onto the surface of a sample (each carrier) using an automatic specific surface area measuring device ("MACSORB MODEL 1208", product of Mountech Co., Ltd.), and the BET specific surface area of the sample was measured by the flow method (BET single point method). In detail, the mass of an empty cell was measured. Next, 9 g of the sample was loaded in the cell so as not to be attached to the inner wall of the cell. Nitrogen was allowed to flow into the cell loaded with the sample at a temperature of 45° C. for 30 minutes while the flow rate of the nitrogen was adjusted to 25 mL/min using a flow meter. In the manner as above, the sample was degassed. Next, the cell was cooled for 2 minutes and measurement using the automatic specific surface area measuring device was then started. After the measurement start, adsorption was carried by immersing the cell in liquid nitrogen in a Dewar bottle and desorption was then carried out by returning the cell from the Dewar bottle to the atmosphere. Automatic measurement during the desorption measured the actual surface area of the sample. A BET specific surface area (unit: m$^2$/g) of the sample was obtained based on the measured values using a formula "(specific surface area)=(actual surface area of sample)/(mass of sample)". The measurement results are shown in Tables 5 to 7.

<Measurement of Shape Factor>

First, the volume median diameter of the carrier particles was measured using a laser diffraction/scattering particle size distribution analyzer ("LA-950", product of HORIBA, Ltd.), and the measured value was taken as the actual carrier particle diameter (unit: um).

Next, the true specific gravity (unit: g/cm$^3$) of the carrier particles was measured using a dry automatic density meter ("ACCUPYC II 1340 SERIES", product of Micromeritics Instrument Corporation, accessories: Multivolume kit, measurement principle: dry density measurement using constant volume expansion method). A calculated carrier particle diameter (unit: um) was determined based on the measured true specific gravity and the BET specific surface area of the carrier particles, using formula "calculated carrier particle diameter=6/(true specific gravity of carrier particles×BET specific surface area of carrier particles). The BET specific surface area was measured in the above-described <Measurement of BET Specific Surface Area>.

Next, the shape factor of the carrier particles was determined from the formula "shape factor of carrier particles=actual carrier particle diameter/calculated carrier particle diameter". The determined shape factors of the carrier particles are shown in Tables 5 to 7.

<Calculation of Value (FR×AD) and Value (FR×AD/Shape Factor)>

Based on the flow rate measured in above-described <Measurement of Flow Rate (FR) of Carrier Particles>, the apparent density measured in above-described <Measurement of Apparent Density (AD) of Carrier Particles>, and the shape factor measured in above-described <Measurement of Shape Factor>, a value (FR×AD) was calculated according to the formula "FR×AD", and a value (FR×AD/shape factor) was calculated according to the formula "FR×AD/shape factor". The calculation results are shown in Tables 5 to 7.

<Evaluation>

An evaluation apparatus (prototype produced by KYOCERA Document Solutions Japan Inc.) having the following configuration was used for evaluation of each developer. The developer was loaded into a development device for cyan color of the evaluation apparatus, and a toner for replenishment use was loaded into a toner container for cyan color thereof.

(Configuration of Evaluation Apparatus)

Sheet conveyance speed: 55 sheets/min

Surface profile of developer bearing member: knurled profile

Outer diameter of developer bearing member: 20-mm diameter

Recesses in developer bearing member: recesses in 80 lines in circumferential direction Restriction blade: magnetic blade constituted by SUS430

Thickness of restriction blade: 1.5 mm

Amount of developer transported: 345 $g/m^2$

Development roller peripheral speed/drum peripheral speed: 1.8 (trail in opposite positions)

Distance between photosensitive member and development roller: 0.375 mm

Photosensitive member: amorphous silicon photosensitive member

Bias applied to development roller: AC bias, duty 50%, rectangular wave form, Vpp 1,125 v, frequency 10 KHz Toner charging polarity: positive chargeability Using the evaluation apparatus, durable printing of printing A4-size image on 100,000 sheets of paper was carried out under the printing conditions (specifically, conditions of a printing environment, a printing mode, and an image printing rate) shown in Table 11.

The printing environments shown in Table 11 were as follows.

LL environment: environment at a temperature of 10° C. and a relative humidity of 15%

NN environment: environment at a temperature of 22° C. and a relative humidity of 50%

HH environment: environment at a temperature of 32.5° C. and a relative humidity of 80%

The printing modes shown in Table 11 were as follows.

Consecutive mode: mode for consecutive sheet printing 5-sheet intermittent mode: mode for repeating printing pattern of 5-sheet printing and 12-second printing stop The images with printing rates shown in Table 11 were as follows.

2%: character image at a printing rate of 2%

5%: character image at a printing rate of 5%

20%: character image at a printing rate of 20%

50%: character image at a printing rate of 50%

Note that "Start" in Table 11 indicates from which sheet of the 100,000 sheets of paper printing under the corresponding printing conditions starts. Furthermore, "Image evaluation timing" indicates that image evaluation was carried out after image printing on which sheet out of 100,000 sheets of paper has been done. In addition, for changing the printing environment, the evaluation apparatus was left to stand for 24 hours in the changed printing environment and the durable printing was resumed then. The evaluation results of the developers are shown in Tables 8 to 10.

(Image Density Evaluation Method)

First, a solid image (A4 size) was printed on one sheet of paper using the evaluation apparatus in the NN environment and the printed sheet was taken to be a first evaluation sheet. Next, the aforementioned durable printing was carried out. In the durable printing, a solid image (A4 size) was printed on one sheet of paper with each timing shown in Table 11 using the evaluation apparatus. The printed sheet was taken to be a second evaluation sheet. The image density of each solid image printed on the first evaluation sheet and the second evaluation sheets was measured using a reflectance densitometer ("RD-19I", product of X-Rite Inc.). Thereafter, a decrease width in image density was calculated using a formula "(decrease width in image density)=(image density of solid image printed on first evaluation sheet)-(image density of solid image printed on second evaluation sheet)". A decrease width in image density for each of the second evaluation images was calculated. The maximum value of the calculated decrease widths was taken to be an evaluation value. The evaluation value was rated according to the following criteria. A smaller decrease width in image density indicates that images with desired image density can be formed more stably. Cases rated as A, B, or C in the evaluation were considered passed, and cases rated as D were considered failed.

(Evaluation Criteria of Image Density)

A: Decrease width in image density of less than 0.2

B: decrease width in image density of at least 0.2 and less than 0.3

C: decrease width in image density of at least 0.3 and less than 0.4

D (poor): decrease width in image density of 0.4 or more (Evaluation Method of Image Density Differences within Formed Images)

The above durable printing was carried out. During the durable printing, a solid image (A4 size) was printed on one sheet of paper using the evaluation apparatus at the image evaluation timing shown in Table 11, and the printed sheet was used as an evaluation sheet. Using a reflection densitometer ("RD-19I" product of X-Rite Inc.), the image density of each of the top end area, bottom end area, left end area, and right end area of the solid image printed on the evaluation sheet was measured. An image density difference within one formed image was calculated based on the highest image density (maximum image density) and the lowest image density (minimum image density) among the four measured image densities, using formula "Image density difference=maximum image density-minimum image density". Image density difference was calculated for all the evaluation sheets, and the maximum value of the calculated image density differences was taken as an evaluation value. Evaluation values were evaluated according to the following criteria. The cases rated as A or B were determined to be passed, and the case rated as C was determined to be failed.

(Evaluation Criteria of Image Density Differences within Formed Images)

A: image density difference of at least 0.00 and less than 0.20

B: image density difference of at least 0.20 and less than 0.40

C (Poor): image density difference of 0.40 or more (Fog Resistance Evaluation Method)

The aforementioned durable printing was carried out. In the durable printing, a blank image (A4 size) was printed on one sheet of paper with each timing shown in Table 11 using the evaluation apparatus. The printed sheets were each taken to be an evaluation sheet. The reflection density of a blank area of the evaluation sheet was measured using a white light meter ("TC-6DS", product of Tokyo Denshoku Co., Ltd.). Thereafter, a fog density was calculated using a formula "(fog density)=(reflection density of blank area)-(reflection density of unprinted sheet)". Fog density of each of the evaluation sheets was calculated. The maximum value of the calculated fog densities was taken to be an evaluation value. The evaluation value was rated according to the following criteria. Cases rated as A or B in the evaluation were considered passed, and cases rated as C were considered failed.

(Evaluation Criteria of Fog Density)

A: fog density of less than 0.010

B: fog density of at least 0.010 and less than 0.020

C (poor): fog density of 0.020 or more (Method for Evaluating Inhibition of Occurrence of Carrier Development)

The aforementioned durable printing was carried out. In the durable printing, a blank image (A4 size) was printed on one sheet of paper with each timing shown in Table 11 using the evaluation apparatus. The printed sheet was taken to be an evaluation sheet. The blank image printed on the evaluation sheet was observed using a loupe with a magnification of 25×. The numbers of carriers present in regions each with an area of 10 $cm^2$ in the blank image was counted as the number of carriers per unit area. The number of carriers present in each of 10 regions (specifically, upstream 3 regions, central 4 regions, and downstream 3 regions in terms of a sheet travelling direction) of the blank image printed on each evaluation sheet was counted. Thereafter, the number (unit: occurrences/$cm^2$) of occurrences of carrier development was obtained using a formula "(number of occurrences of carrier development)=(total number of carriers present in 10 regions)/(total area of 10 regions)=(total number of carriers present in 10 regions)/100". The number of occurrences of carrier development was calculated for each of the evaluation sheets. The maximum value of the calculated numbers of occurrences of carrier development was taken to be an evaluation value. The evaluation value was rated according to the following criteria. Cases rated as A, B, or C in the evaluation were considered passed, and cases rated as D were considered failed.

(Evaluation Criteria of Inhibition of Occurrence of Carrier Development)

A: number of occurrences of carrier development of less than 0.1 occurrences/$cm^2$ B: number of occurrences of carrier development of at least 0.1 occurrences/$cm^2$ and less than 0.3 occurrences/$cm^2$ C: number of occurrences of carrier development of at least 0.3 occurrences/$cm^2$ and less than 1.0 occurrences/$cm^2$ D (poor): number of occurrences of carrier development of 1.0 occurrences/$cm^2$ or more (Method for Evaluating Inhibition of Decrease in Texture)

First, a halftone image (band-shaped image with a printing rate of 50%) was printed on one sheet of paper using the evaluation apparatus in the NN environment and the printed sheet was taken to be a first evaluation sheet. Next, the aforementioned durable printing was carried out. In the durable printing, a halftone image (band-shaped image with a printing rate of 50%) was printed on one sheet of paper with each timing shown Table 11 using the evaluation apparatus. The printed sheets were each taken to be a second evaluation sheet. The texture of the halftone images printed on the first evaluation sheet and the second evaluation sheet was observed with the naked eye. By doing so, it was confirmed to what extent the texture of the halftone image printed on the second evaluation sheet was decreased compared to the texture of the halftone image printed on the first evaluation sheet. Of all the second evaluation sheets, the evaluation sheet with texture of the halftone image decreased the worst was evaluated according to the following criteria. Cases rated as A, B, or C in the evaluation were considered passed, and cases rated as D were considered failed.

(Evaluation Criteria of Inhibition of Decrease in Texture)

A: No decrease in texture occurred at all.

B: Decrease in texture occurred to some extent.

C: Decrease in texture occurred to the extent that there is no problem involved in actual use D (poor): Decrease in texture occurred that is noticeable to the extent that it involves a problem in actual use.

(Evaluation Method of Inhibition of Occurrence of Image Defects Resulting from Cleaning Failure)

The aforementioned durable printing was carried out. In the durable printing, a character image with a printing rate of 5% was printed on one sheet of paper with each timing shown in Table 11 using the evaluation apparatus. The printed sheets each were taken to be an evaluation sheet. The character image printed on each evaluation sheet was observed with the naked eye to confirm the occurrence or non-occurrence of image defects resulting from cleaning failure. Note that the image defects resulting from cleaning failure are image defects in which a thin line parallel to the sheet travelling direction appears. Of all the evaluation sheets, the evaluation sheet in which image defects resulting from cleaning failure occurred the most was evaluated according to the following criteria. Cases rated as A, B, or C in the evaluation were considered passed, and cases rated as D were considered failed.

(Evaluation Criteria of Inhibition of Occurrence of Image Defects Resulting from Cleaning Failure)

A: No image defects resulting from cleaning failure occurred at all.

B: Some image defects resulting from cleaning failure occurred.

C: Image defects resulting from cleaning failure occurred to the extent that there is no problem involved in actual use.

D (poor): Image defects resulting from cleaning failure occurred that are noticeable to the extent that they involve a problem in actual use.

The meanings of the terms used below in Tables 2 to 10 are explained next. The terms in Tables 2 to 10 mean as follows.

Core: carrier cores $D_{50}$: volume median diameter

Solid content amount: solid content amount of coating resin The solid content amount of the coating resin is calculated using a formula "[solid content amount (unit: part by mass) of coating resin]=[amount (unit: part by mass) of silicone resin solution] x [solid concentration (unit: % by mass) of silicone resin solution]/100".

Resin/core: resin/core rate (unit: % by mass) The resin/core rate was calculated using a formula "[resin/core rate (unit: % by mass)]=100×[mass (unit: parts by mass) of coating resin]/[mass (unit: parts by mass) of carrier cores]=100×[solid content amount (unit parts by mass) of silicone resin solution]/[mass (unit: parts by mass) of carrier cores]".

wt %: % by mass

Part: parts by mass

BT: barium titanate particles

Method: barium titanate particle production method

Hydrothermal: hydrothermal synthesis

Oxalate: oxalate method

Amount ratio in column "BT": content of barium titanate particles to 100 parts by mass of coating resin Diameter: number average primary particle diameter CB: carbon black particles Amount ratio in column "CB": content of carbon black particles relative to 100 parts by mass of coating resin Coat layer/core: coat layer/core rate The coat layer/core rate is calculated using a formula "[coat layer/core rate (unit: % by mass)]=100×[mass (unit: parts by mass) of coat layers]/[mass (unit: part by mass) of carrier cores]=100×[mass (unit: part by mass) of solid content of coating liquid]/[mass (unit: part by mass) of carrier cores]=100×{[solid content amount (unit: part by mass) of silicone resin solution]+[mass (unit: part by mass) of barium titanate]+[mass (unit: part by mass) of carbon black]}/[mass (unit: part by mass) of carrier cores]".

KR-255: silicone resin solution ("KR-255", product of Shin-Etsu Chemical Co., Ltd., solid content: methylphenyl silicone resin, solid concentration: 50% by mass)

KR-301: silicone resin solution ("KR-301", product of Shin-Etsu Chemical Co., Ltd., solid content: methylphenyl silicone resin, solid concentration: 40% by mass)

ES-1001N: silicone resin solution ("ES-1001N", product of Shin-Etsu Chemical Co., Ltd., solid content: epoxy resin modified silicone resin, solid concentration: 45% by mass)

EC: carbon black ("KETJEN BLACK EC-300J", product of Lion Specialty Chemicals Co., Ltd., conductive carbon black, DBP oil absorption: 360 $cm^3$/100 g, BET specific surface area: 1270 $m^2$/g, number average primary particle diameter: 39.5 nm)

MA: carbon black ("MITSUBISHI (registered Japanese trademark) CARBON BLACK MA100", product of Mitsubishi Chemical Corporation, DBP oil absorption: 100 $cm^3$/100 g, BET specific surface area: 110 $m^2$/g, number average primary particle diameter: 24 nm)

RE: carbon black ("REGAL (registered Japanese trademark) 400", product of Cabot Corporation)

FR: flow rate of carrier particles

AD: apparent density of carrier particles

BET: BET specific surface area of carrier particles

FR×AD: value (FR×AD)

FR×AD/shape factor: value (FR×AD/shape factor)

FD: fog density

Fog: rating of fog resistance

Carrier development: rating of inhibition of occurrence of carrier development

Texture: rating of inhibition of decrease in texture

Image density: rating of image density

Cleaning: rating of inhibition of occurrence of image defects resulting from cleaning failure Density difference: evaluation of image density differences within formed images Not measured: the attempt to form an image for evaluation on a recording medium failed due to the toner contained in the developer. As a result, the physical properties of the carrier in the developer were not measured.

Image formation impossible: evaluation was not possible as an attempt to form an image on a recording medium with the corresponding developer failed due to insufficient development.

–: no corresponding components were used, or there are no corresponding values.

TABLE 2

| | | Core | | | Coat layer | | | | | | | | | |
|---|---|---|---|---|---|---|---|---|---|---|---|---|---|---|
| | | | Saturation | Coat | Coating resin | | | BT | | | | CB | | |
| Developer | Carrier | $D_{50}$ [μm] | magnetization [emu/g] | layer/Core [wt %] | Type | Solid content [g] | Resin/Core [wt %] | Method | Amount [g] | Amount ratio [part] | Diameter [nm] | Type | Amount [g] | Amount ratio [part] |
| A-1 | CA-1 | 20.3 | 67 | 3.9 | KR-255 | 180.6 | 3.6 | Hydrothermal | 9.0 | 5 | 102 | EC | 5.4 | 3 |
| A-2 | CA-2 | 34.7 | 80 | 2.6 | KR-255 | 117.1 | 2.3 | Hydrothermal | 5.9 | 5 | 304 | EC | 7.0 | 6 |
| A-3 | CA-3 | 58.8 | 87 | 3.6 | KR-255 | 157.9 | 3.2 | Hydrothermal | 7.9 | 5 | 495 | EC | 14.2 | 9 |
| A-4 | CA-4 | 20.3 | 67 | 0.6 | KR-255 | 26.1 | 0.5 | Hydrothermal | 2.3 | 9 | 304 | EC | 1.6 | 6 |
| A-5 | CA-5 | 34.7 | 80 | 1.3 | KR-255 | 55.1 | 1.1 | Hydrothermal | 5.0 | 9 | 495 | EC | 5.0 | 9 |
| A-6 | CA-6 | 58.8 | 87 | 0.9 | KR-255 | 40.2 | 0.8 | Hydrothermal | 3.6 | 9 | 102 | EC | 1.2 | 3 |
| A-7 | CA-7 | 20.4 | 80 | 3.9 | KR-255 | 151.2 | 3.0 | Hydrothermal | 30.2 | 20 | 102 | EC | 13.6 | 9 |
| A-8 | CA-8 | 35.2 | 87 | 4.0 | KR-255 | 162.6 | 3.3 | Hydrothermal | 32.5 | 20 | 304 | EC | 4.9 | 3 |
| A-9 | CA-9 | 59.5 | 67 | 0.5 | KR-255 | 19.8 | 0.4 | Hydrothermal | 4.0 | 20 | 495 | EC | 1.2 | 6 |
| A-10 | CA-10 | 20.7 | 87 | 0.6 | KR-255 | 22.6 | 0.5 | Hydrothermal | 6.1 | 27 | 495 | EC | 1.4 | 6 |

TABLE 3

| Developer | Carrier | Core D$_{50}$ [µm] | Core Saturation magnetization [emu/g] | Coat layer/Core [wt %] | Coat layer Coating resin Type | Coating resin Solid content [g] | Coating resin Resin/Core [wt %] | BT Method | BT Amount [g] | BT Amount ratio [part] | BT Diameter [nm] | CB Type | CB Amount [g] | CB Amount ratio [part] |
|---|---|---|---|---|---|---|---|---|---|---|---|---|---|---|
| A-11 | CA-11 | 35.5 | 67 | 2.9 | KR-255 | 106.6 | 2.1 | Hydrothermal | 28.8 | 27 | 102 | EC | 9.6 | 9 |
| A-12 | CA-12 | 59.7 | 80 | 0.4 | KR-255 | 15.4 | 0.3 | Hydrothermal | 4.2 | 27 | 304 | EC | 0.5 | 3 |
| A-13 | CA-13 | 20.4 | 80 | 2.9 | KR-255 | 105.1 | 2.1 | Hydrothermal | 36.8 | 35 | 495 | EC | 3.2 | 3 |
| A-14 | CA-14 | 35.2 | 87 | 1.3 | KR-255 | 46.1 | 0.9 | Hydrothermal | 16.1 | 35 | 102 | EC | 2.8 | 6 |
| A-15 | CA-15 | 59.5 | 67 | 0.9 | KR-255 | 31.3 | 0.6 | Hydrothermal | 10.9 | 35 | 304 | EC | 2.8 | 9 |
| A-16 | CA-16 | 20.7 | 87 | 3.8 | KR-255 | 123.4 | 2.5 | Hydrothermal | 55.5 | 45 | 304 | EC | 11.1 | 9 |
| A-17 | CA-17 | 35.5 | 67 | 1.7 | KR-255 | 57.4 | 1.1 | Hydrothermal | 25.8 | 45 | 495 | EC | 1.7 | 3 |
| A-18 | CA-18 | 59.7 | 80 | 1.7 | KR-255 | 56.3 | 1.1 | Hydrothermal | 25.3 | 45 | 102 | EC | 3.4 | 6 |
| B-1 | CB-1 | 35.1 | 80 | 3.9 | KR-255 | 177.3 | 3.5 | Hydrothermal | 5.3 | 3 | 304 | EC | 12.4 | 7 |
| B-2 | CB-2 | 34.7 | 80 | 4.0 | KR-255 | 127.4 | 2.5 | Hydrothermal | 63.7 | 50 | 304 | EC | 8.9 | 7 |

TABLE 4

| Developer | Carrier | Core D$_{50}$ [µm] | Core Saturation magnetization [emu/g] | Coat layer/Core [wt %] | Coat layer Coating resin Type | Coating resin Solid content [g] | Coating resin Resin/Core [wt %] |
|---|---|---|---|---|---|---|---|
| B-3 | CB-3 | 20.3 | 80 | 2.9 | KR-255 | 118.9 | 2.4 |
| B-4 | CB-4 | 58.8 | 80 | 1.4 | KR-255 | 57.4 | 1.1 |
| B-5 | CB-5 | 34.7 | 87 | 4.5 | KR-255 | 200.9 | 4.0 |
| B-6 | CB-6 | 58.8 | 87 | 0.7 | KR-255 | 31.3 | 0.6 |
| A-19 | CA-19 | 34.7 | 80 | 1.3 | ES-1001N | 51.2 | 1.0 |
| A-20 | CA-20 | 34.7 | 80 | 1.3 | KR-301 | 51.2 | 1.0 |
| A-21 | CA-21 | 34.7 | 80 | 1.3 | KR-255 | 51.2 | 1.0 |
| B-7 | CB-7 | 34.7 | 80 | 1.3 | KR-255 | 51.2 | 1.0 |
| A-22 | CA-22 | 34.7 | 80 | 1.3 | KR-255 | 51.2 | 1.0 |
| A-23 | CA-23 | 34.7 | 80 | 1.3 | KR-255 | 51.2 | 1.0 |
| B-8 | CB-8 | 34.7 | 80 | 5.0 | KR-255 | 196.9 | 3.9 |
| B-9 | CB-9 | 34.7 | 80 | Coat layer formation not done | | | |

| Developer | Coat layer BT Method | BT Amount [g] | BT Amount ratio [part] | BT Diameter [nm] | CB Type | CB Amount [g] | CB Amount ratio [part] |
|---|---|---|---|---|---|---|---|
| B-3 | Hydrothermal | 17.8 | 15 | 76 | EC | 8.3 | 7 |
| B-4 | Hydrothermal | 8.6 | 15 | 687 | EC | 4.0 | 7 |
| B-5 | Hydrothermal | 10.0 | 5 | 304 | EC | 14.1 | 7 |
| B-6 | Hydrothermal | 1.6 | 5 | 304 | EC | 2.2 | 7 |
| A-19 | Hydrothermal | 10.2 | 20 | 304 | EC | 3.6 | 7 |
| A-20 | Hydrothermal | 10.2 | 20 | 304 | EC | 3.6 | 7 |
| A-21 | Oxalate | 10.2 | 20 | 304 | EC | 3.6 | 7 |
| B-7 | Hydrothermal | 10.2 | 20 | 304 | EC | 3.6 | 7 |
| A-22 | Hydrothermal | 10.2 | 20 | 304 | MA | 3.6 | 7 |
| A-23 | Hydrothermal | 10.2 | 20 | 304 | RE | 3.6 | 7 |
| B-8 | Hydrothermal | 39.4 | 20 | 304 | EC | 13.8 | 7 |
| B-9 | Coat layer formation not done | | | | | | |

TABLE 5

| Developer | Carrier | Film mass per unit area [g/m$^2$] | FR [sec/50 g] | BET [m$^2$/g] | Shape factor | FR × AD | FR × AD/Shape factor |
|---|---|---|---|---|---|---|---|
| A-1 | CA-1 | 0.66 | 25.9 | 3.7 | 62.2 | 54.7 | 0.88 |
| A-2 | CA-2 | 0.75 | 27.7 | 2.2 | 63.6 | 63.5 | 1.00 |
| A-3 | CA-3 | 1.76 | 27.8 | 3.2 | 80.5 | 60.8 | 0.76 |

TABLE 5-continued

| Developer | Carrier | Film mass per unit area [g/m$^2$] | FR [sec/50 g] | BET [m$^2$/g] | Shape factor | FR × AD | FR × AD/ Shape factor |
|---|---|---|---|---|---|---|---|
| A-4 | CA-4 | 0.10 | 26.9 | 2.0 | 34.4 | 56.7 | 1.65 |
| A-5 | CA-5 | 0.38 | 27.1 | 1.3 | 36.9 | 62.1 | 1.68 |
| A-6 | CA-6 | 0.44 | 29.8 | 1.2 | 61.4 | 73.0 | 1.19 |
| A-7 | CA-7 | 0.66 | 26.4 | 3.5 | 59.3 | 54.8 | 0.92 |
| A-8 | CA-8 | 1.17 | 28.3 | 2.6 | 75.1 | 63.5 | 0.85 |
| A-9 | CA-9 | 0.25 | 29.2 | 0.7 | 35.7 | 74.4 | 2.08 |
| A-10 | CA-10 | 0.10 | 26.4 | 2.1 | 34.8 | 53.6 | 1.54 |

TABLE 6

| Developer | Carrier | Film mass per unit area [g/m$^2$] | FR [sec/50 g] | BET [m$^2$/g] | Shape factor | FR × AD | FR × AD/ Shape factor |
|---|---|---|---|---|---|---|---|
| A-11 | CA-11 | 0.86 | 28.3 | 2.5 | 73.4 | 66.1 | 0.90 |
| A-12 | CA-12 | 0.20 | 29.2 | 0.7 | 34.9 | 73.3 | 2.10 |
| A-13 | CA-13 | 0.49 | 27.0 | 2.6 | 43.4 | 56.1 | 1.29 |
| A-14 | CA-14 | 0.38 | 27.1 | 1.2 | 34.4 | 60.9 | 1.77 |
| A-15 | CA-15 | 0.45 | 29.9 | 1.1 | 57.1 | 76.4 | 1.34 |
| A-16 | CA-16 | 0.66 | 25.9 | 3.0 | 52.3 | 52.7 | 1.01 |
| A-17 | CA-17 | 0.50 | 27.7 | 2.0 | 56.9 | 64.5 | 1.13 |
| A-18 | CA-18 | 0.85 | 30.5 | 1.4 | 72.0 | 76.6 | 1.06 |
| B-1 | CB-1 | 1.14 | 27.4 | 2.5 | 73.6 | 62.8 | 0.85 |
| B-2 | CB-2 | 1.16 | 27.4 | 2.4 | 69.5 | 62.7 | 0.90 |

TABLE 7

| Developer | Carrier | Film mass per unit area [g/m$^2$] | FR [sec/50 g] | BET [m$^2$/g] | Shape factor | FR × AD | FR × AD/ Shape factor |
|---|---|---|---|---|---|---|---|
| B-3 | CB-3 | 0.49 | 26.2 | 2.7 | 45.7 | 54.3 | 1.19 |
| B-4 | CB-4 | 0.69 | 29.4 | 1.5 | 73.6 | 73.5 | 1.00 |
| B-5 | CB-5 | 0.16 | 27.7 | 3.0 | 86.5 | 62.0 | 0.72 |
| B-6 | CB-6 | 0.78 | 29.7 | 0.7 | 33.8 | 72.7 | 2.15 |
| A-19 | CA-19 | 0.38 | 27.0 | 1.3 | 36.9 | 62.1 | 1.68 |
| A-20 | CA-20 | 0.38 | 27.0 | 1.3 | 36.9 | 64.8 | 1.75 |
| A-21 | CA-21 | 0.38 | 27.2 | 1.3 | 36.9 | 59.8 | 1.62 |
| B-7 | CB-7 | 0.38 | 27.1 | 1.3 | 36.9 | 62.1 | 1.68 |
| A-22 | CA-22 | 0.38 | 27.0 | 1.3 | 36.9 | 62.1 | 1.68 |
| A-23 | CA-23 | 0.38 | 27.0 | 1.3 | 36.9 | 64.8 | 1.76 |
| B-8 | CB-8 | 1.45 | 28.2 | 3.9 | 65.2 | 64.5 | 4.87 |
| B-9 | CB-9 | — | Not measured | | | | |

TABLE 8

| | | | | External additive | | | | | |
|---|---|---|---|---|---|---|---|---|---|
| | | | | Silica particles | | Resin particles | | | |
| | Developer | Carrier | Toner | Diameter [nm] | Amount [part] | Type | Diameter [nm] | Amount [part] | Fog FD |
| Example 1 | A-1 | CA-1 | TA-1 | 20 | 1.5 | R1 | 30 | 0.4 | 0.012 |
| Example 2 | A-2 | CA-2 | TA-2 | 20 | 1.5 | R1 | 30 | 0.7 | 0.015 |
| Example 3 | A-3 | CA-3 | TA-3 | 20 | 1.5 | R1 | 30 | 1.0 | 0.017 |
| Example 4 | A-4 | CA-4 | TA-4 | 20 | 1.5 | R2 | 40 | 0.4 | 0.011 |
| Example 5 | A-5 | CA-5 | TA-5 | 20 | 1.5 | R2 | 40 | 0.7 | 0.015 |
| Example 6 | A-6 | CA-6 | TA-6 | 20 | 1.5 | R2 | 40 | 1.0 | 0.018 |
| Example 7 | A-7 | CA-7 | TA-7 | 20 | 1.5 | R3 | 60 | 0.4 | 0.012 |
| Example 8 | A-8 | CA-8 | TA-8 | 20 | 1.5 | R3 | 60 | 0.7 | 0.014 |

TABLE 8-continued

| | | | | | | | | | |
|---|---|---|---|---|---|---|---|---|---|
| Example 9 | A-9 | CA-9 | TA-9 | 20 | 1.5 | R3 | 60 | 1.0 | 0.017 |
| Example 10 | A-10 | CA-10 | TA-10 | 20 | 1.5 | R4 | 80 | 0.4 | 0.005 |

| | Fog Rating | Carrier development | Texture | Image density | Cleaning | Density difference Value | Density difference Rating |
|---|---|---|---|---|---|---|---|
| Example 1 | B | B | A | B | A | 0.10 | A |
| Example 2 | B | A | A | B | A | 0.15 | A |
| Example 3 | B | A | B | B | A | 0.36 | B |
| Example 4 | B | A | A | B | A | 0.34 | B |
| Example 5 | B | B | A | B | A | 0.12 | A |
| Example 6 | B | A | C | B | A | 0.17 | A |
| Example 7 | B | A | A | B | A | 0.23 | B |
| Example 8 | B | A | B | B | A | 0.35 | B |
| Example 9 | B | B | A | B | A | 0.08 | A |
| Example 10 | A | A | B | A | A | 0.28 | B |

TABLE 9

| | Developer | Carrier | Toner | External additive: Silica particles Diameter [nm] | Silica particles Amount [part] | Resin particles Type | Resin particles Diameter [nm] | Resin particles Amount [part] | Fog FD |
|---|---|---|---|---|---|---|---|---|---|
| Example 11 | A-11 | CA-11 | TA-11 | 20 | 1.5 | R4 | 80 | 0.7 | 0.007 |
| Example 12 | A-12 | CA-12 | TA-12 | 20 | 1.5 | R4 | 80 | 1.0 | 0.009 |
| Example 13 | A-13 | CA-13 | TA-13 | 20 | 1.5 | R5 | 100 | 0.4 | 0.004 |
| Example 14 | A-14 | CA-14 | TA-14 | 20 | 1.5 | R5 | 100 | 0.7 | 0.007 |
| Example 15 | A-15 | CA-15 | TA-15 | 20 | 1.5 | RS | 100 | 1.0 | 0.008 |
| Example 16 | A-16 | CA-16 | TA-16 | 20 | 1.5 | R6 | 120 | 0.4 | 0.005 |
| Example 17 | A-17 | CA-17 | TA-17 | 20 | 1.5 | R6 | 120 | 0.7 | 0.007 |
| Example 18 | A-18 | CA-18 | TA-18 | 20 | 1.5 | R6 | 120 | 1.0 | 0.009 |
| Comparative Example 1 | B-1 | CB-1 | TB-1 | 20 | 1.5 | R2 | 40 | 0.7 | 0.022 |
| Comparative Example 2 | B-2 | CB-2 | TB-2 | 20 | 1.5 | R2 | 40 | 0.7 | 0.023 |

| | Fog Rating | Carrier development | Texture | Image density | Cleaning | Density difference Value | Density difference Rating |
|---|---|---|---|---|---|---|---|
| Example 11 | A | A | A | A | A | 0.25 | B |
| Example 12 | A | B | B | A | A | 0.07 | A |
| Example 13 | A | A | A | A | A | 0.34 | B |
| Example 14 | A | B | B | A | A | 0.09 | A |
| Example 15 | A | A | B | A | A | 0.16 | A |
| Example 16 | A | B | B | A | A | 0.13 | A |
| Example 17 | A | A | A | A | A | 0.15 | A |
| Example 18 | A | A | B | A | A | 0.18 | A |
| Comparative Example 1 | C (NG) | A | A | D (NG) | A | 0.33 | B |
| Comparative Example 2 | C (NG) | A | A | A | A | 0.30 | B |

TABLE 10

| | Developer | Carrier | Toner | External additive: Silica particles Diameter [nm] | Silica particles Amount [part] | Resin particles Type | Resin particles Diameter [nm] | Resin particles Amount [part] | Fog FD |
|---|---|---|---|---|---|---|---|---|---|
| Comparative Example 3 | B-3 | CB-3 | TB-3 | 20 | 1.5 | R2 | 40 | 0.7 | 0.022 |
| Comparative Example 4 | B-4 | CB-4 | TB-4 | 20 | 1.5 | R2 | 40 | 0.7 | 0.004 |
| Comparative Example 5 | B-5 | CB-5 | TB-5 | 20 | 1.5 | R2 | 40 | 0.7 | 0.024 |
| Comparative Example 6 | B-6 | CB-6 | TB-5 | 20 | 1.5 | R2 | 40 | 0.7 | 0.021 |
| Example 19 | A-19 | CA-19 | TA-19 | 20 | 1.5 | R2 | 40 | 0.7 | 0.014 |
| Example 20 | A-20 | CA-20 | TA-20 | 20 | 1.5 | R2 | 40 | 0.7 | 0.014 |
| Example 21 | A-21 | CA-21 | TA-21 | 20 | 1.5 | R2 | 40 | 0.7 | 0.018 |
| Comparative Example 7 | B-7 | CB-7 | TB-7 | 20 | 1.5 | — | — | — | 0.022 |
| Example 22 | A-22 | CA-22 | TA-22 | 20 | 1.5 | R2 | 40 | 0.7 | 0.015 |

TABLE 10-continued

| | | | | | | | | | |
|---|---|---|---|---|---|---|---|---|---|
| Example 23 | A-23 | CA-23 | TA-23 | 20 | 1.5 | R2 | 40 | 0.7 | 0.015 |
| Comparative Example 8 | B-8 | CB-8 | TB-8 | 20 | 1.5 | R2 | 40 | 0.7 | 0.028 |
| Comparative Example 9 | B-9 | CB-9 | TB-9 | 20 | 1.5 | R2 | 40 | 0.7 | Image formation impossible |

| | Fog | Carrier | | Image | | Density difference | |
|---|---|---|---|---|---|---|---|
| | Rating | development | Texture | density | Cleaning | Value | Rating |
| Comparative Example 3 | C (NG) | A | A | B | A | 0.37 | B |
| Comparative Example 4 | A | A | B | B | D (NG) | 0.18 | A |
| Comparative Example 5 | C (NG) | A | B | B | A | 0.26 | B |
| Comparative Example 6 | C (NG) | A | C | B | A | 0.53 | C (NG) |
| Example 19 | B | B | A | B | A | 0.09 | A |
| Example 20 | B | B | A | B | A | 0.11 | A |
| Example 21 | B | B | A | B | A | 0.10 | A |
| Comparative Example 7 | C (NG) | B | C | B | A | 0.12 | A |
| Example 22 | B | B | A | B | A | 0.12 | A |
| Example 23 | B | B | A | B | A | 0.10 | A |
| Comparative Example 8 | C (NG) | B | A | B | A | 0.24 | B |
| Comparative Example 9 | | | Image formation impossible | | | | |

TABLE 11

| | | | | | | | | |
|---|---|---|---|---|---|---|---|---|
| Start (Sheet number) | 1 | 5,001 | 10,001 | 15,001 | 15,101 | 20,001 | 20,501 | 25,001 |
| Image evaluation timing (Sheet number) | 5,000 | 10,000 | 15,000 | 15,100 | 20,000 | 20,500 | 25,000 | 30,000 |
| Environment | NN | NN | NN | NN | NN | NN | NN | NN |
| Mode | Consecutive | Consecutive | Consecutive | Consecutive | Consecutive | Consecutive | Consecutive | 5-sheet intermittent |
| Printing rate | 5% | 5% | 2% | 50% | 2% | 20% | 5% | 5% |
| Start (Sheet number) | 30,001 | 35,001 | 35,101 | 40,001 | 45,001 | 50,001 | 50,101 | 55,001 |
| Image evaluation timing (Sheet number) | 35,000 | 35,100 | 40,000 | 45,000 | 50,000 | 50,100 | 55,000 | 55,500 |
| Environment | NN | NN | NN | HH | HH | HH | HH | HH |
| Mode | 5-sheet intermittent | 5-sheet intermittent | 5-sheet intermittent | Consecutive | Consecutive | Consecutive | Consecutive | Consecutive |
| Printing rate | 2% | 50% | 5% | 5% | 2% | 50% | 5% | 20% |
| Start (Sheet number) | 55,501 | 60,001 | 60,101 | 65,001 | 70,001 | 70,501 | 75,001 | 75,101 |
| Image evaluation timing (Sheet number) | 60,000 | 60,100 | 65,000 | 70,000 | 70,500 | 75,000 | 75,100 | 80,000 |
| Environment | HH | HH | HH | LL | LL | LL | LL | LL |
| Mode | 5-sheet intermittent | 5-sheet intermittent | 5-sheet intermittent | Consecutive | Consecutive | 5-sheet intermittent | 5-sheet intermittent | 5-sheet intermittent |
| Printing rate | 2% | 50% | 5% | 2% | 50% | 2% | 50% | 5% |
| Start (Sheet number) | | 80,001 | 85,001 | 85,101 | 90,001 | 90,101 | 95,001 | |
| Image evaluation timing (Sheet number) | | 85,000 | 85,100 | 90,000 | 90,100 | 95,000 | 100,000 | |
| Environment | | NN | NN | NN | NN | NN | NN | |
| Mode | | Consecutive | Consecutive | intermittent | intermittent | Consecutive | 5-sheet intermittent | |
| Printing rate | | 2% | 50% | 2% | 50% | 2% | 2% | |

As shown in Table 3, the content of the barium titanate particles of the carrier particles contained in the carrier (CB-1) of the developer (B-1) was less than 5 parts by mass relative to 100 parts by mass of the coating resin. As shown in Table 9, the evaluation results of fog resistance and image density for the developer (B-1) were both rated as poor and determined to be failed.

As shown in Table 3, the content of the barium titanate particles of the carrier particles contained in the carrier (CB-2) of the developer (B-2) was greater than 45 parts by mass relative to 100 parts by mass of the coating resin. As shown in Table 9, the evaluation result of fog resistance for the developer (B-2) was rated as poor and determined to be failed.

As shown in Table 4, the number average primary particle diameter of the barium titanate particles of the carrier particles contained in the carrier (CB-3) of the developer (B-3) was less than 100 nm. As shown in Table 10, the evaluation result of fog resistance for the developer (B-3) was rated as poor and determined to be failed.

As shown in Table 4, the number average primary particle diameter of the barium titanate particles of the carrier particles contained in the carrier (CB-4) of the developer (B-4) was greater than 500 nm. As shown in Table 10, the evaluation result of inhibition of occurrence of image defects resulting from cleaning failure for the developer (B-4) was rated as poor and determined to be failed.

As shown in Table 7, the shape factor of the carrier particles contained in the carrier (CB-5) of the developer (B-5) was greater than 85.0. As shown in Table 10, the evaluation result of fog resistance for the developer (B-5) was rated as poor and determined to be failed.

As shown in Table 7, the shape factor of the carrier particles contained in the carrier (CB-6) of the developer (B-6) was less than 34.0. As shown in Table 10, the evaluation results of fog resistance and image density difference within the formed image for the developer (B-6) were both rated as poor and determined to be failed.

As shown in Table 10, the external additive particles in the toner particles included in the toner (TB-7) of the developer (B-7) did not include resin particles containing a crosslinked resin. As shown in Table 10, the evaluation result of fog resistance for the developer (B-7) was rated as poor and determined to be failed.

As shown in Table 4, the coat layer/core rate of the carrier particles contained in the carrier (CB-8) of the developer (B-8) was greater than 4.9% by mass. As shown in Table 10, the evaluation result of fog resistance for the developer (B-8) was rated as poor and determined to be failed.

As shown in Table 4, the carrier particles contained in the carrier (CB-9) of the developer (B-9) did not include coat layers, and the coat layer/core rate was 0.0% by mass. As shown in Table 10, the attempt to form an image for evaluation on the recording medium failed due to the toner contained in the developer (B-9). As a result, it was not possible to evaluate the developer (B-9).

As shown in Tables 2 to 10, each of the developers (A-1) to (A-23) had the following features. That is, the external additive particles of the toner particles included resin particles containing a crosslinked resin. The coat layers of the carrier particles contained barium titanate particles and a coating resin including a silicone resin. The barium titanate particles had a number average primary particle diameter of at least 100 nm and no greater than 500 nm. The barium titanate particles had a content of at least 5 parts by mass and no greater than 45 parts by mass relative to 100 parts by mass of the coating resin. The coat layer/core rate was greater than 0.0% by mass and no greater than 4.9% by mass. The shape factor of the carrier particles was at least 34.0% and no greater than 85.0%. As shown in Tables 8 to 10, all of the evaluation results of fog resistance, the evaluation results of image density, the evaluation results of image density differences within the formed images, and the evaluation results of inhibition of occurrence of image defects resulting from cleaning failure for the developers (A-1) to (A-22) were determined to be passed. As shown in Tables 8 to 10, the evaluation results of inhibition of decrease in texture and the evaluation results of inhibition of occurrence of carrier development for the developers (A-1) to (A-23) were also determined to be passed.

From the above, it was demonstrated that the developer of the present invention, which encompasses the developers (A-1) to (A-23), can contribute to excellent fog resistance, stable formation of images with desired image density, small image density differences within formed images, and inhibit occurrence of image defects resulting from cleaning failure.

INDUSTRIAL APPLICABILITY

The developer according to the present invention can be used for image formation in copiers, printers, and multifunction peripherals, for example.

The invention claimed is:

1. A two-component developer comprising:

a toner containing toner particles; and a carrier containing carrier particles, wherein the toner particles each include a toner mother particle and external additive particles provided on a surface of the toner mother particle, the external additive particles include resin particles, the resin particles contain a crosslinked resin including a repeating unit derived from a crosslinking agent, the carrier particles each include a carrier core and a coat layer covering a surface of the carrier core, the coat layers contain a coating resin and barium titanate particles, the coating resin includes a silicone resin, the barium titanate particles have a number average primary particle diameter of at least 100 nm and no greater than 500 nm, the barium titanate particles have a content of at least 5 parts by mass and no greater than 45 parts by mass relative to 100 parts by mass of the coating resin, a rate of a mass of the coat layers to a mass of the carrier cores is greater than 0.0% by mass and no greater than 4.9% by mass, the carrier particles have a shape factor of at least 34.0 and no greater than 85.0.

2. The two-component developer according to claim 1, wherein the carrier particles satisfy formula (1), $$0.73 \leq FR \times AD/X \leq 2.10 \quad (1)$$

where in the formula (1), FR represents a flow rate of the carrier particles, AD represents an apparent density of the carrier particles, and X represents the shape factor of the carrier particles.

3. The two-component developer according to claim 1, wherein the mass of the coat layer is at least 0.10 $g/m^2$ and no greater than 1.80 $g/m^2$ per unit area of the surfaces of the carrier cores on the assumption that the carrier cores are true spheres.

4. The two-component developer according to claim 1, wherein the coat layers further contain carbon black particles.

5. The two-component developer according to claim 1, wherein the content of the barium titanate particles is at least 25 parts by mass and no greater than 45 parts by mass relative to 100 parts by mass of the coating resin.

6. The two-component developer according to claim 1, wherein the carrier cores have a saturation magnetization of at least 65 emu/g and no greater than 90 emu/g.

7. The two-component developer according to claim 1, wherein the carrier cores have a volume median diameter of at least 20.0 μm and no greater than 60.0 μm.

8. The two-component developer according to claim 1, wherein a rate of a mass of the coating resin to the mass of the carrier cores is greater than 0.0% by mass and no greater than 4.0% by mass.

9. The two-component developer according to claim 1, wherein the carrier particles have a BET specific surface area of at least 0.6 $m^2/g$ and no greater than 4.7 $m^2/g$.

10. The two-component developer according to claim 1, wherein the resin particles have a number average primary particle diameter of at least 30 nm and no greater than 120 nm.

11. The two-component developer according to claim 1, wherein the crosslinked resin contained in the resin particles is a styrene-acrylic resin, and the repeating unit derived from the crosslinking agent is a repeating unit derived from a compound having two or more vinyl groups.

* * * * *